(12) United States Patent
Matykiewicz

(10) Patent No.: US 12,256,014 B2
(45) Date of Patent: Mar. 18, 2025

(54) SECURE UNIQUE GLYPH CARRIER CONFIGURED TO INTERFACE WITH CUSTOMIZABLE FINITE STATE MACHINE

(71) Applicant: Pawel Matykiewicz, Bellevue, WA (US)

(72) Inventor: Pawel Matykiewicz, Bellevue, WA (US)

( * ) Notice: Subject to any disclaimer, the term of this patent is extended or adjusted under 35 U.S.C. 154(b) by 151 days.

(21) Appl. No.: 17/995,173

(22) PCT Filed: Jul. 22, 2021

(86) PCT No.: PCT/US2021/070933
§ 371 (c)(1),
(2) Date: Sep. 30, 2022

(87) PCT Pub. No.: WO2022/032255
PCT Pub. Date: Feb. 10, 2022

(65) Prior Publication Data
US 2023/0155837 A1    May 18, 2023

Related U.S. Application Data

(60) Provisional application No. 63/061,630, filed on Aug. 5, 2020.

(51) Int. Cl.
*H04L 9/32* (2006.01)
*G06K 19/06* (2006.01)

(52) U.S. Cl.
CPC ...... *H04L 9/3236* (2013.01); *G06K 19/06037* (2013.01)

(58) Field of Classification Search
CPC .......... H04L 9/3236; G06K 19/06037
USPC .......................................... 713/189
See application file for complete search history.

(56) References Cited

U.S. PATENT DOCUMENTS

| 5,995,625 | A  * | 11/1999 | Sudia ............ G06F 21/6209 713/181 |
| 7,640,074 | B2 | 12/2009 | Bajocich |
| 8,464,343 | B1 * | 6/2013 | Cidambi ............ G06F 21/51 726/22 |
| 8,819,448 | B2 * | 8/2014 | Frieder ............ G06F 21/6227 380/278 |
| 9,021,269 | B2 * | 4/2015 | Spilman ............ H04L 9/3239 713/168 |
| 9,183,315 | B2 | 11/2015 | Lim |
| 10,032,057 | B2 | 7/2018 | Burkhart |
| 10,546,360 | B2 * | 1/2020 | Powers ............ G06F 21/00 |
| 11,838,422 | B1 * | 12/2023 | Nam ............ G06K 19/06037 |

(Continued)

FOREIGN PATENT DOCUMENTS

WO    2019096837 A1    5/2019

*Primary Examiner* — Dant B Shaifer Harriman
(74) *Attorney, Agent, or Firm* — Scott Seeley; EASTGATE IP

(57) ABSTRACT

Systems and methods for generating a series of connected secure, unique glyph carriers configured to interface with customizable finite state machines are described herein. In some embodiments, the present disclosure relates to systems and methods for scanning the secure, unique glyph carriers disclosed herein. The systems and methods may include a database in communication with a finite state machine. In various configurations, the systems and methods may be used to detect a forgery of the secure, unique glyphs described herein.

19 Claims, 14 Drawing Sheets

(56) References Cited

U.S. PATENT DOCUMENTS

| | | | |
|---|---|---|---|
| 2001/0017932 A1* | 8/2001 | Chang | G06K 19/06046 |
| | | | 382/100 |
| 2010/0142005 A1* | 6/2010 | Roskind | G09C 5/00 |
| | | | 380/54 |
| 2012/0248182 A1* | 10/2012 | Partridge | G06F 3/129 |
| | | | 235/375 |
| 2012/0308003 A1* | 12/2012 | Mukherjee | H04L 9/3247 |
| | | | 380/243 |
| 2016/0072626 A1* | 3/2016 | Kouladjie | G06F 21/44 |
| | | | 713/189 |
| 2017/0085562 A1* | 3/2017 | Schultz | G06V 40/1371 |
| 2017/0161754 A1* | 6/2017 | Hattar | G06Q 30/0185 |
| 2017/0237555 A1* | 8/2017 | Roullier | H04L 9/0816 |
| | | | 705/14.4 |
| 2017/0257358 A1* | 9/2017 | Ebrahimi | H04L 9/3236 |
| 2018/0082050 A1* | 3/2018 | Flink | H04L 9/3228 |
| 2018/0144122 A1* | 5/2018 | Dymond | G06F 21/46 |
| 2018/0171378 A1 | 6/2018 | Santore et al. | |
| 2018/0181378 A1* | 6/2018 | Bakman | G06F 8/38 |
| 2019/0182042 A1* | 6/2019 | Ebrahimi | H04L 9/3234 |
| 2019/0188369 A1* | 6/2019 | Ogawa | H04L 63/0853 |
| 2021/0182863 A1* | 6/2021 | Doraiswamy | G06Q 20/02 |
| 2022/0043899 A1* | 2/2022 | Chiu | G06F 21/44 |
| 2022/0277102 A1* | 9/2022 | Kim | H04L 9/0643 |
| 2023/0385442 A1* | 11/2023 | Sievert | G16H 40/67 |

\* cited by examiner

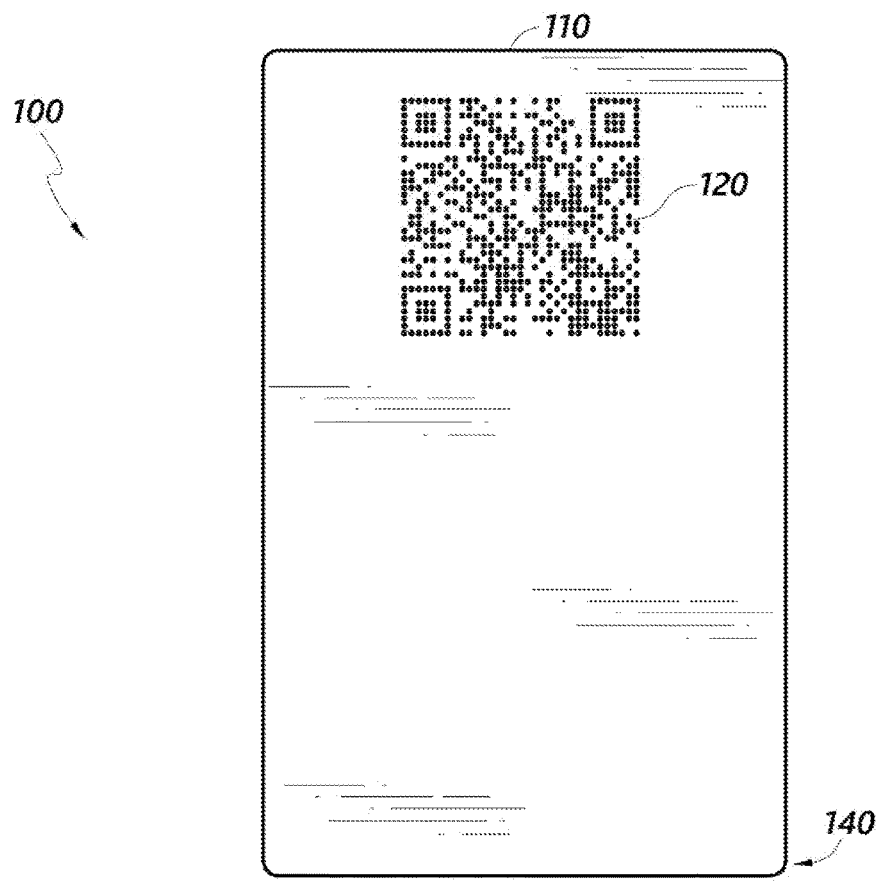
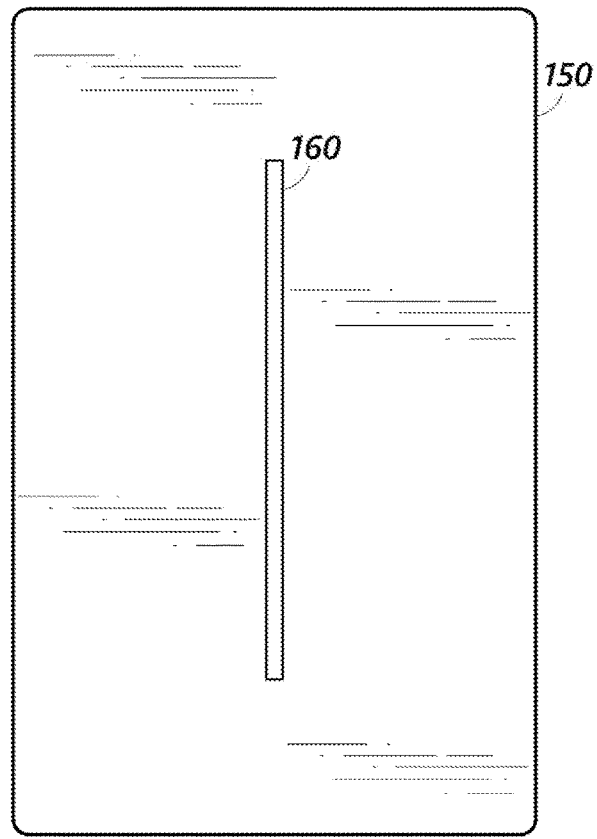
FIG. 1D

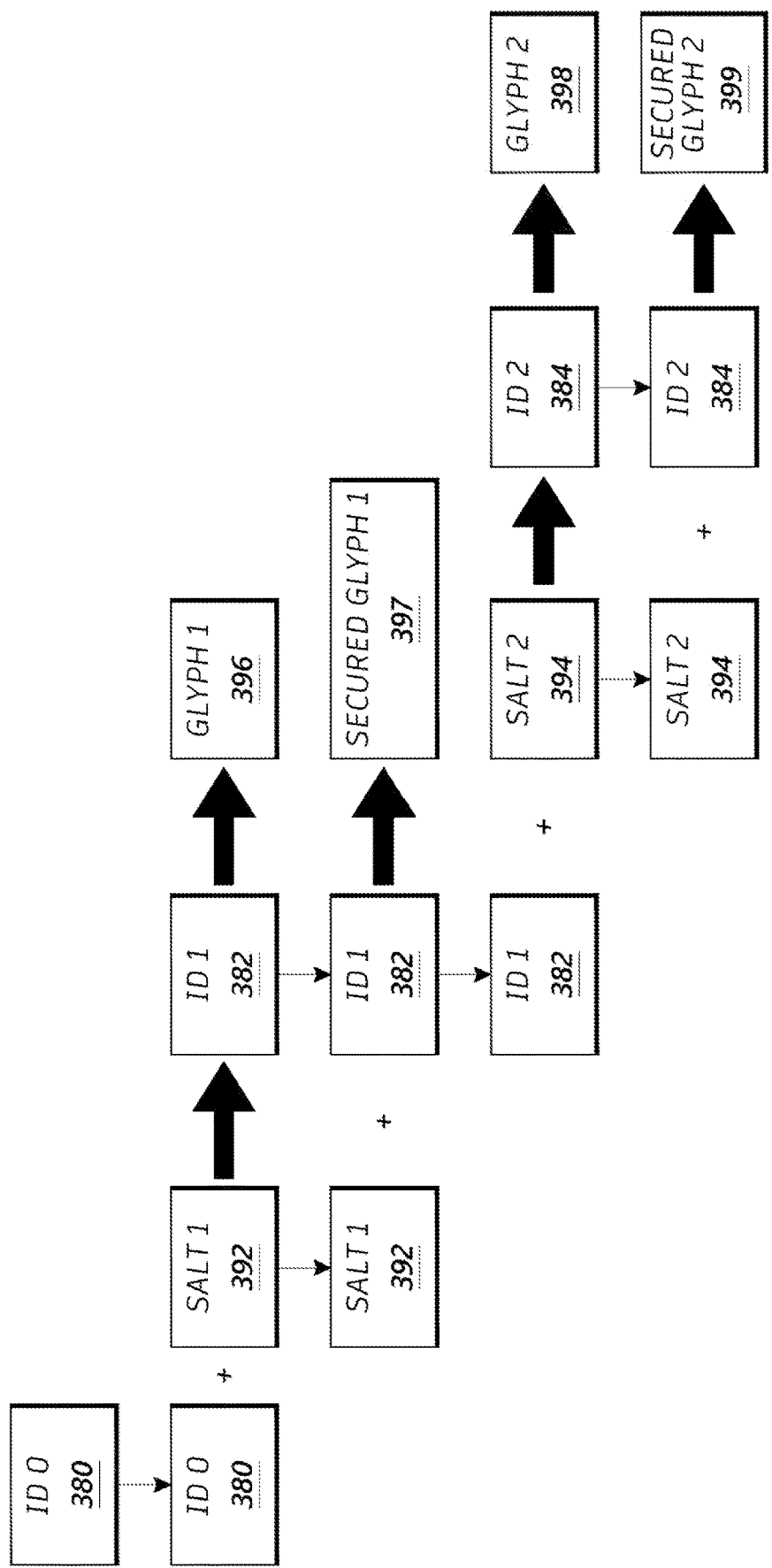

New QBar Group 510
test

New Program Name 520
Basic Login

New Program Template 530
Redirect everyone to a URL

Redirect to this URL 540
http://qbar.systems

| Group Name | Program Name | Program Template | Program Values | Program Runs | Program Location | Update Program | Disown | Owners |
|---|---|---|---|---|---|---|---|---|
| test | Basic Login #1 (GL_U - DEMO US) | Login to a basic control panel | {"Wrong owner message": "This QBar already has an owner. Try a different one."} | All versions unique runs 1; all versions total runs 1; current version unique runs 1; current version total runs 1. | Approximate Location, Extract Location | Last Control QBar | ☐ | +1 844-448-5504 |
| test | Basic Login #2 (fUyf - DEMO US) | Redirect everyone to a URL | {"Redirect to this URL": "https://qbar.systems"} | All versions unique runs 0; all versions total runs 0; current version unique runs 0; current version total runs 0. | Approximate Location, Extract Location | ▶ | ☐ | +1 844-448-5504 |

Table of QBars that belong to a user with a phone number +1 844-448-5504.

550

560

Update 570

FIG. 5

SECURE UNIQUE GLYPH CARRIER CONFIGURED TO INTERFACE WITH CUSTOMIZABLE FINITE STATE MACHINE

CROSS REFERENCE TO RELATED APPLICATION

This application claims the benefit of U.S. Provisional Patent Application No. 63/061,630, filed Aug. 5, 2020, which is incorporated by reference herein in its entirety. This application is a national stage application, filed under 35 U.S.C. § 371, of International Patent Application No. PCT/US 21/70933, filed on Jul. 22, 2021, which is incorporated by reference herein in its entirety.

BACKGROUND

Field

The present disclosure generally relates to secure unique glyph carriers, as well as apparatuses, systems, and methods for preparing and using the same.

Description of Certain Related Art

Online businesses enjoy significant advantages over brick-and-mortar retail stores. Online businesses are able to leverage digital storefronts comprising a multitude of links, pages, and other digital checkpoints that are configured to monitor and store nearly all customer interaction with the digital storefront from the time a customer visits a site. This data is often maintained for extended periods, such as until a customer abandons all ties with the business for, e.g., one year—though many companies maintain customer interaction data even longer. Indeed, many businesses produce apps that can gather additional data concerning nearly every aspect of a customer's interactions with the storefront. This customer behavioral information and clickstream data can be mined to understand how a business's products are used, and what aspects of a business or its products are valued by consumers. In turn, this understanding can be used to improve a business's practices or products in ways that matter to consumers and can increase the efficiency of production and distribution. In many instances, key decisionmakers may receive scheduled status reports to show how small changes in a product, its production process, marketing, placement, or any other of a wide variety of possible variables affects customer or employee response, enabling rapid A/B testing to further develop the business.

However, traditional brick and mortar retail stores typically do not have access to such robust customer interaction data, lacking a system of digital customer interaction checkpoints that form a cornerstone of online businesses. As an example, if a customer of a brick-and-mortar store interacts with a disgruntled employee and leaves a negative review, it can be difficult if not impossible for the owner of a traditional brick and mortar retail store to track the interaction and identify the cause of the negative review, which can lead to significant loss of reputation and profits.

Attempts by retail stores to obtain additional customer data are often met unfavorably by consumers. For instance, customers are often dissuaded from patronizing establishments that have garnered a reputation for unduly monitoring their consumers. Moreover, placement of proximity sensors and cameras is expensive and inefficient, requiring a large amount of expensive monitoring equipment and a significant initial capital investment. Furthermore, the time and effort necessary to properly gather, review, and analyze the data provided by this type of monitoring can be so time intensive that is cannot be accomplished effectively through manual methods.

SUMMARY

The present disclosure relates to secure, glyph carriers. In some embodiments, the glyph carriers may be secure unique QR code carriers, or carriers of other types of glyphs. For instance, in some embodiments, a secure, unique QR code carrier may comprise a polymer substrate having a thickness of about 0.75 mm. In some embodiments, the polymer substrate may comprise a cap layer and a core layer. In certain configurations, the cap layer has a thickness of about 0.025 mm to about 0.05 mm. In various configurations, the polymer substrate includes a plurality of engravings depicting a QR code. The plurality of engravings may have a depth of about 0.08 mm.

In some embodiments, the present disclosure relates to systems and methods for scanning a test QR code carrier. For instance, methods in accordance with the present disclosure may include providing a unique QR code carrier engraved with a QR code and having unique machine errors. The method may further comprise providing a database storing: the QR code; a high-resolution image of the unique QR code carrier; and a plurality of URLs including at least one URL associated with forgery detection. In certain configurations, a finite state machine is provided in communication with the database. The finite state machine may have a plurality of inputs and states wherein each of the plurality of states are associated with one or more inputs; and wherein each of the plurality of inputs points to one or more states. In some configurations, the method may include receiving, at the database: a scan of a test QR code from a scanning device; a photograph of a test QR code carrier; parameters of the scan of the test QR code; parameters of the photograph of the test QR code carrier; and accessing, at the finite state machine, one or more of: the scan of the test QR code, the photograph of the test QR code, the parameters of the scan of the test QR code, and the parameters of the photograph of the test QR code carrier. In certain configurations, the method may further comprise entering a first state, at the finite state machine, the first state including: analyzing one or more of the parameters of the scan of the test QR code and the parameters of the photograph of the test QR code to detect a risk of forgery; wherein a first input includes detecting a risk of forgery based on one or more of: the parameters of the scan of the QR test code and the parameters of the photograph of the test QR code; based on the detection of the risk of forgery, entering a second state including: comparing the photograph of the test QR code carrier with the high-resolution image of the unique QR code carrier to detect a match; wherein a second input includes determining the photograph of the test QR code carrier does not match the high-resolution image of the unique QR code carrier; and based on the determination that the photograph of the test QR code carrier does not match the high-resolution image of the unique QR code carrier, entering a third state including delivering the URL associated with forgery detection to the scanning device.

The present disclosure further relates to methods for generating a series of connected glyphs, wherein each glyph is based on the previously generated glyph. In various implementations, the method may comprise: generating a first glyph from a first identification string, wherein the first identification string is a digest containing a predetermined byte, the digest resulting from hashing a first salt and an initial identification string; generating a second identification string by: hashing a second salt with the first identification string to obtain a second identification string containing at least one predetermined byte; and using the second identification string to generate a second glyph that is based on the first glyph. The at least one predetermined byte may include at least one of starting with "00" and ending with "00." Likewise, the salt may start or end with at least one predetermined character, such as "q." In some configurations, the first identification string is a URL-safe digest having a predetermined length resulting from hashing a first salt and an initial identification string. For instance, the digest may be limited to 32 URL-safe characters. Likewise, the first and second salts may begin with a predetermined character and have a predetermined length, and the first glyph may be a pixel matrix readable as a 2-dimensional barcode. Generating a glyph can include generating a QR matrix. As disclosed herein, generating a glyph based on the digest can include converting the digest into base64 and appending the result to a subdomain to yield a URL. The glyph can be a QR code that when scanned causes a device to navigate to the URL. In some particularly secure configurations, the device is only caused to navigate to the URL when the glyph is scanned a predetermined number of times.

In some configurations, the method further comprises generating a first security string based on the identity of the first salt. The method may also comprise modifying the first pixel matrix readable as a 2-dimensional barcode based on the identity of the first security string. For instance, the 2-dimensional barcode may comprise columns and rows of pixels, and modifying the 2-dimensional barcode based on the identity of the first salt may comprise: obtaining the alphabet index of first four characters of the first salt to yield a first security string consisting of four numbers; reversing a first pixel in the corresponding row of the first column based on the first character of the security string; reversing a second pixel in the corresponding row of the second column based on the second character of the security string; reversing a third pixel in the corresponding row of the third column based on the third character of the security string; and reversing a fourth pixel in the corresponding row of the fourth column based on the fourth character of the security string. The initial identification string may have been previously used to generate a glyph.

In some embodiments, modifying the glyph based on the security string may include generating a security code based on the security string and modifying the glyph based on the security code. For instance, modifying the glyph based on the security code may include preparing instructions to reverse pixels of the glyph based on the identity of the security code.

The glyphs disclosed herein can be inscribed on a substrate. A photograph of the substrate may be stored in a database. The photograph may be a high-resolution photograph. For instance, in some embodiments, the photograph has a spatial resolution of at least 1 mm. As such, in some embodiments, methods of generating and utilizing the glyphs disclosed herein may further comprise receiving a scanning photograph of an inscription on a substrate from a scanning device. In particularly secure implementations, the glyph encodes a URL pointing to a first resource, the resource configured to redirect to a second resource if the scanning photograph matches the stored photograph of the inscription on the substrate.

The present disclosure also relates to a system for generating a series of secure unique glyphs. The system may include a processor and memory, the memory containing instructions that when executed by the processor cause the processor to: generate a first glyph from a first identification string, wherein the first identification string is a digest resulting from hashing a first salt and an initial identification string; generate a second identification string by: hashing a second salt with the first identification string to obtain a second identification string; and use the second identification string as a seed to generate a second glyph. As such, in some embodiments the present disclosure relates to a series of connected glyphs, wherein each glyph is based on a preceding glyph and comprises: a pixel matrix generated from an identification string; wherein the identification string is a cryptographic digest resulting from hashing an initial identification string with a salt; wherein the identification string starts or ends with a predefined byte; and wherein the pixel matrix includes a security modification based on the identity of the initial salt.

BRIEF DESCRIPTION OF DRAWINGS

Various embodiments are depicted in the accompanying drawings for illustrative purposes and should in no way be interpreted as limiting the scope of the embodiments. Various features of different disclosed embodiments can be combined to form additional embodiments, which are part of this disclosure.

FIGS. 1A-G schematically illustrate various embodiments of a secure, unique quick response (QR) code carrier system prepared in accordance with certain embodiments of the present disclosure.

FIGS. 3A-C schematically illustrate a method for generating a secure unique QR code in accordance with certain embodiments of the present disclosure.

FIG. 5 is a screenshot of an example of a dashboard used to customize the functionality of one or more secure unique QR code carriers prepared in accordance with certain embodiments of the present disclosure.

DETAILED DESCRIPTION OF CERTAIN EMBODIMENTS

Figure 1B:
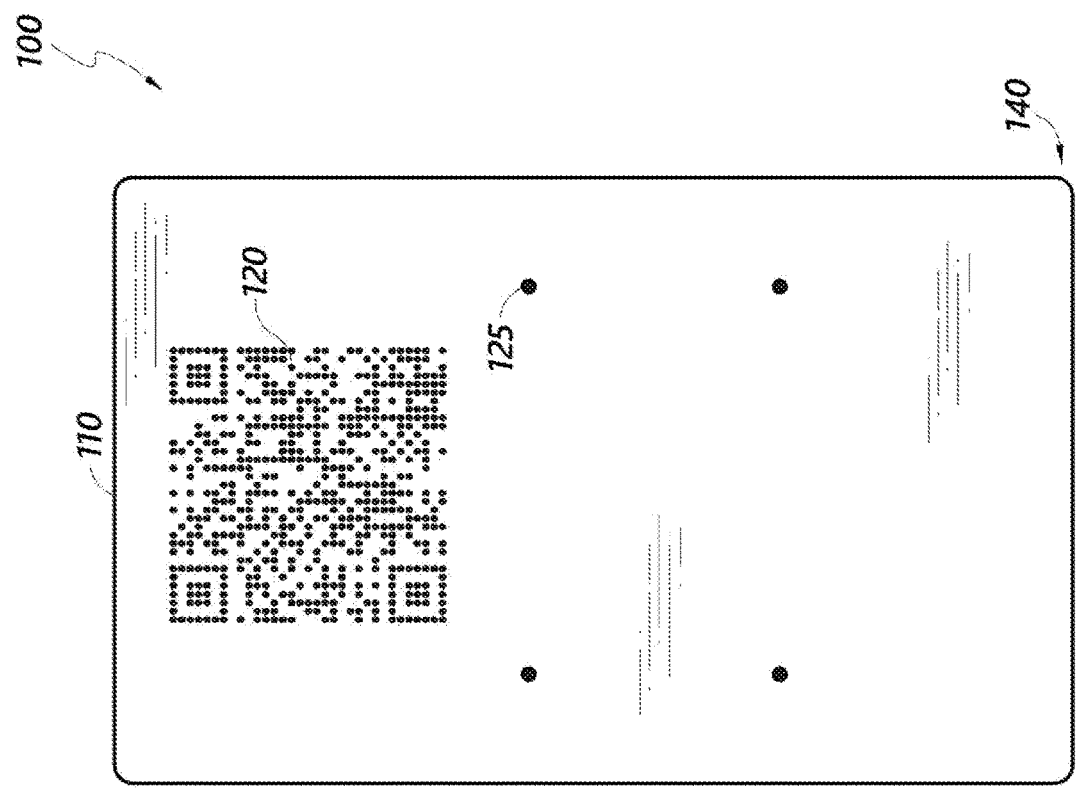

Various systems and methods relating to secure, unique glyph carriers are described below to illustrate various examples that may achieve one or more desired improvements. These examples are only illustrative and not intended in any way to restrict the general disclosure presented or the various aspects and features described herein. Furthermore, the general principles described herein may be applied to embodiments and applications other than those specifically discussed herein without departing from the spirit and scope of the disclosure. This disclosure is not limited to any particular embodiment shown but is instead to be accorded the widest scope consistent with the principles and features that are disclosed or suggested.

Although certain aspects, advantages, and features are described herein, it is not necessary that any particular embodiment include or achieve any or all of those aspects, advantages, or features. Some embodiments may not achieve the advantages described herein but may achieve other advantages instead. Any structure, material, feature, or step in any embodiment can be used in place of, or in addition to, any structure, feature, or step in any other embodiment, or omitted. This disclosure contemplates all combinations of features from the various disclosed embodiments. No feature, structure, or step is essential or indispensable.

Overview

The present disclosure relates to secure unique glyph carries, methods of preparing secure unique glyph carriers, and methods of utilizing secure unique glyph carriers, among other things. In some embodiments, the secure unique glyph may be a Quick Response (QR) code. QR codes as used herein refer to machine readable 2-dimensional barcodes typically configured to store information. QR codes present significant advantages over traditional 1-dimensional barcodes. For instance, in contrast with traditional 1-dimensional barcodes, 2-dimensional QR codes can store more information in a given glyph, and a larger number of distinguishable glyphs can be generated. However, these advantages come with certain drawbacks. For instance, because such a large number of QR codes can be generated—and since a large number of separate entities generate their own QR codes—it can be difficult to ensure that each generated glyph is unique and that no duplicate patterns have been put into use. In the event that an inadvertently duplicated glyph is generated and scanned, the unwitting scanner will often be directed to the content that the original QR code was designed to point to, which can cause frustration for users. Duplication of glyphs can also complicate the analysis of customer data. Unfortunately, it is simple to duplicate a traditionally printed glyph by scanning or photographing the pattern and reprinting a new copy. In the event of a duplicated glyph, there is no way to determine which glyph is the original, and no way to block the duplicate, even if the duplication was unauthorized.

Often, the information stored in a QR code relates to the item housing the QR code. In other configurations, QR codes can point to a URL or initiate an action such as opening an application on the scanning device. However, once a glyph has been printed, it can be difficult or impossible to update the association between the QR code and an updated URL or alternate content.

The 2-dimensional nature of QR codes introduce certain manufacturing challenges as well. For instance, automated production lines are typically optimized to manufacture a large number of identical items, making it difficult to manufacture a large number of unique, distinguishable items in a single facility. Distributed manufacturing is complicated by the need to avoid inadvertently generating a duplicated code. In various configurations, the secure, unique QR code carriers, as well as the systems and methods disclosed herein, overcome the disadvantages discussed above.

Secure Unique QR Code Carriers

In some embodiments, the present disclosure relates to secure unique QR code carriers which overcome the disadvantages discussed above. As used herein, the term "QBar" may be used interchangeably to refer to secure unique QR code carriers prepared in accordance with the present disclosure. It will be further appreciated that the present disclosure is not limited to QR codes or any other particular implementation of a specific type of glyph. For instance, with regard to the phrase "secure unique QR code carriers," it will be understood that the techniques, methods, and devices presented herein may be implemented with respect to any combination of 1-, 2-, or 3-dimensional glyphs, including glyphs readable in 1-, 2-, or 3-dimensions, and that the present disclosure is not limited to QR codes or matrices.

Figure 1A:
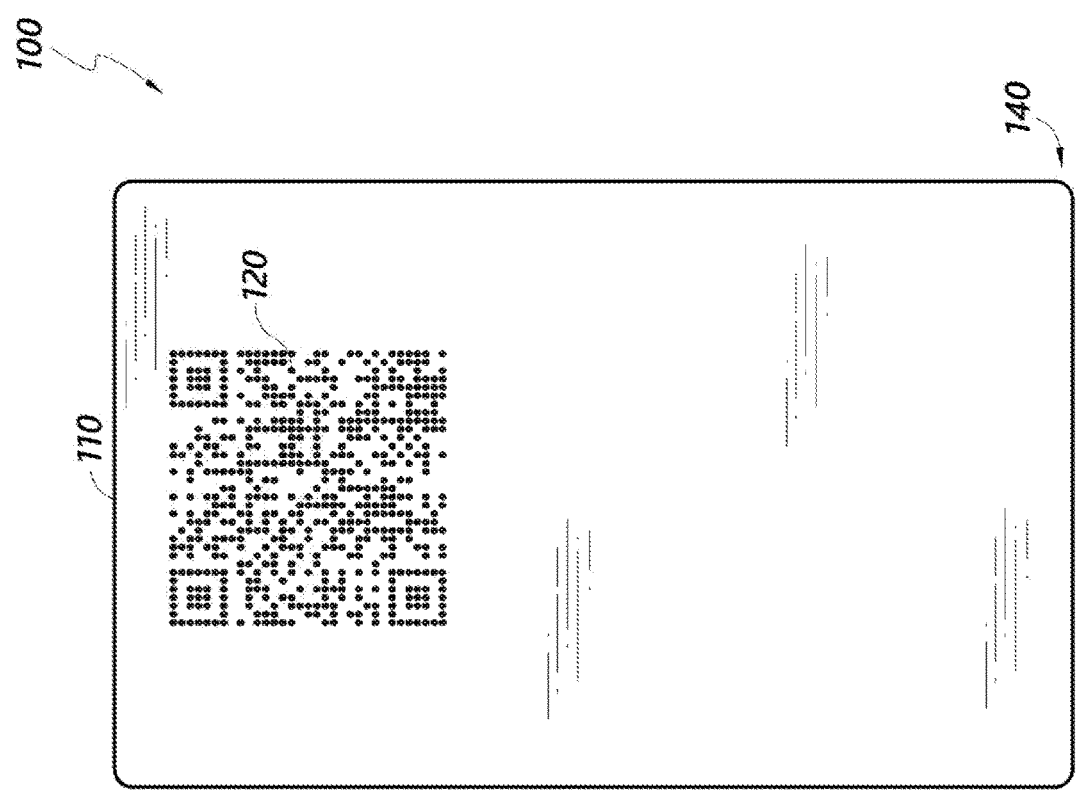
Figure 1C:
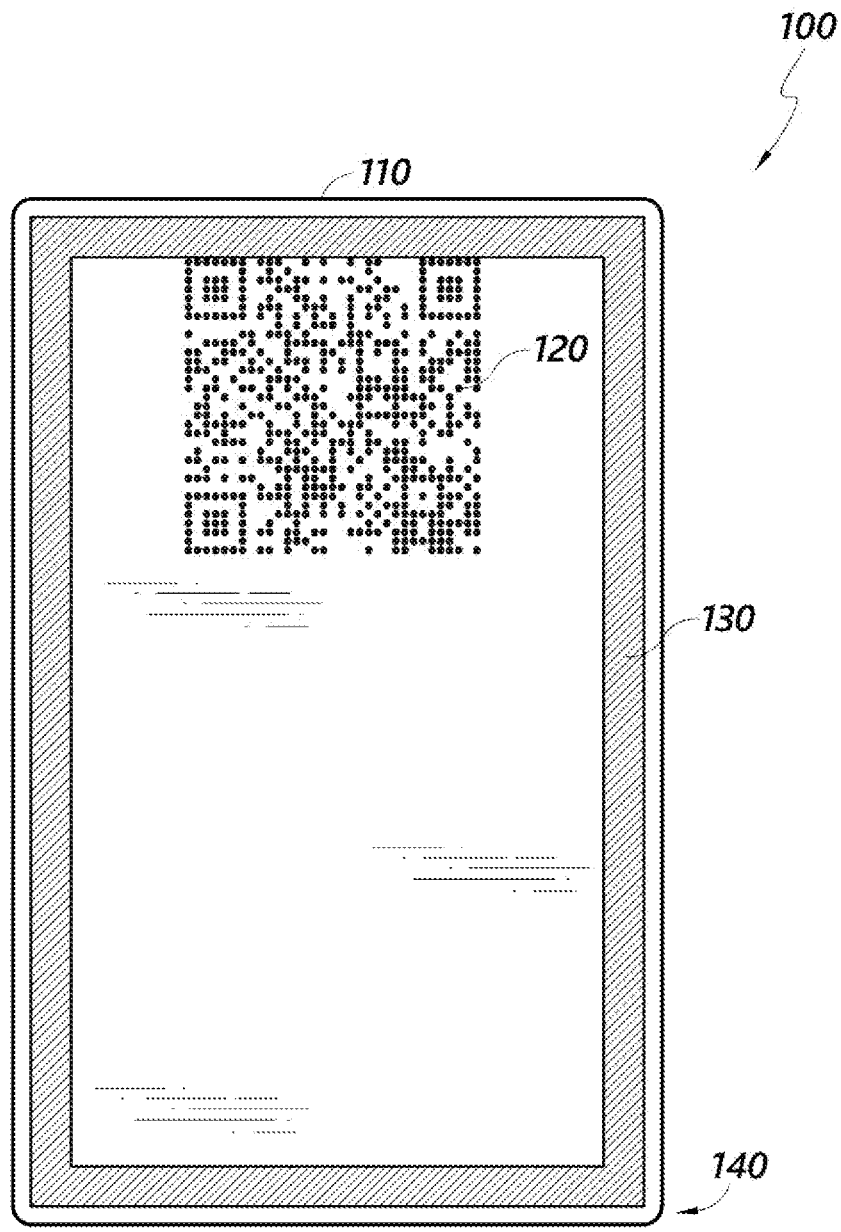

FIGS. 1A-D schematically illustrate embodiments of a secure unique QR code carrier system 100. To facilitate presentation, the system 100 is discussed in connection with displaying a QR code, but it is understood that various additional glyphs may be used without deviating from the scope of the present disclosure. As illustrated in FIG. 1A, the system 100 can include a substrate 110 and glyph 120. As illustrated in FIG. 1B, the system 100 can include a substrate 110, glyph 120, and label markings 125. In the embodiment depicted in FIG. 1B, four label markings are shown, but in other configurations there can be more or fewer label markings, or no label markings. As illustrated in FIG. 1C, the system 100 can include a substrate 110, glyph 120, and a label 130. As illustrated in FIG. 1D, the system 100 can include a substrate 110, glyph 120, and a base 150 having a slot 160. In various configurations, the substrate 110 may include rounded corners 140.

In certain configurations, the substrate 110 is about the size and shape of a credit card, so that the system 100 is portable and discrete. For instance, in certain configurations the substrate 110 is the approximate size and shape of a credit card, having a width ranging from about 42.8 mm to about 171.2 mm, such as about 85.6 mm; a height ranging from about 27 mm to about 107.96 mm such as about 53.98 mm. In the same or different configuration, the substrate 110 has a thickness ranging from about 0.375 mm to about 1.5 mm, such as about 0.75 mm thick. It will be appreciated that, as used herein, the terms height, width, and thickness are used for convenience and refer to measurements made in a first, second, and third dimension. In certain configurations, the substrate 110 may be constructed with rounded corners 140. In other embodiments, the substrate 110 can have sharp corners, other shapes, and/or other dimensions. The system 100 may be placed in a wallet for use as a business card, placed on a table as a centerpiece, drilled into a wall, or placed in any other of a wide variety of storage or display solutions as described below.

In various configurations, the substrate 110 is selected to have certain desirable properties to facilitate the uses described herein. For instance, the substrate 110 can be manufactured from a variety of materials such as metals and polymers, including acrylics. By way of example, in certain configurations the substrate 110 is manufactured from an acrylic such as a microsurface impact acrylic. In certain advantageous configurations, the microsurface impact acrylic may be comprised of two layers including a cap layer and a core layer. In some embodiments, the cap layer thickness of the microsurface impact acrylic may range from about 0.025 mm to about 0.05 mm. In other embodiments, the microsurface can have other dimensions. In certain configurations, the microsurface impact acrylic may be RowMark LaserMax® acrylic, such as LM922-204.

In certain desirable configurations, the substrate 110 is configured to be durable. For example, in certain embodiments the substrate 110 can have a hardness ranging from about M35 to about M80, or higher. In some embodiments, the substrate 110 has a hardness of about M45. Likewise, the substrate 110 may have an IZOD impact strength of about 1.10 ft lbs/in at 22.78° C. The hardness ensures the glyph 120 and machining errors will not be damaged, tarnished, or scuffed away through normal use. In some configurations, the substrate 110 is configured to be thermally resistant, such that the engraved glyph will not become unreadable, damaged, or deformed when exposed to high or low temperatures, such as those that would be experienced when the substrate is washed in a commercial dishwasher, placed in direct sunlight, placed in a commercial freezer, or placed outside in freezing weather. Accordingly, in some embodiments the substrate 110 may have a coefficient of thermal expansion of about $5.6 \times 10^{-5}$ Inch/inch/° F. Likewise, the substrate 110 may have a Vicat softening point ranging from about 80° C. to about 100° C., or higher, such as about 97.78° C.

In certain configurations, the substrate 110 is selected to ensure the resulting system is not brittle. For instance, the substrate may have a tensile strength ranging from about 4,500 psi to about 6,500 psi or higher, such as about 5,500 psi. Likewise, the substrate 110 may have a flexural strength ranging from about 8,000 psi to about 12,000 psi or higher, such as about 10,300 psi. In various configurations, the advantageous physical properties allow the substrate 110 to be drilled into walls, used on a stand on an outdoor table, washed in a commercial dishwasher, placed in a wallet, and the like, without rendering the glyph unreadable.

Advantageously, resulting from the mechanical properties of the substrate 110, such as its chemical composition and its hardness, and due to the process by which the glyph has been impressed upon it, each secure unique QR code carrier exhibits unique manufacturing errors than can be used for security and authentication. For instance, in some configurations, the unique manufacturing errors can be used to detect forgeries.

The glyph 120 may comprise one or more symbols configured to store data. In some embodiments, the glyph 120 can be a QR code such as a series of columns and rows of pixels. However, it will be appreciated that other glyphs and forms of data encoding may be used without deviating from the scope of the present disclosure.

In some embodiments the glyph may be a 1-dimensional barcode. In still further configurations, the glyph 120 may include one or more additional arrangements of 1, 2, or 3-dimensional engravings or markings such as dots, lines, circles, squares, indentations, raised sections, and the like. For instance, in some configurations the glyph 120 may comprise one or more lines or additional arrangements having identifiable features configured to encode data. By way of example, a single line may be implemented having segments of differing shapes or thickness, where one or more differing segments can be used to encode data. Likewise, a plurality of lines may be employed to encode data in a similar fashion. For example, one or more lines may be implemented where one or more of the thickness, spacing, shape, color, or other identifiable features are altered along the at least one of the lines to encode data. In some configurations, the data encoded by the additional arrangements may be the same or different data encoded by the glyph 120.

Figure 1F:
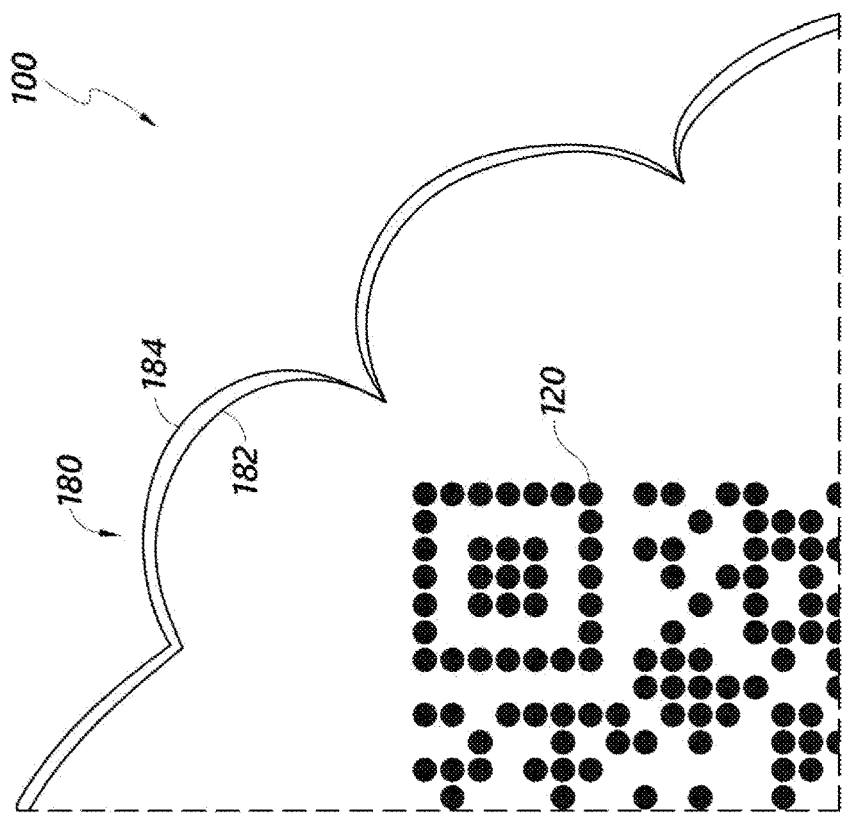
Figure 1E:
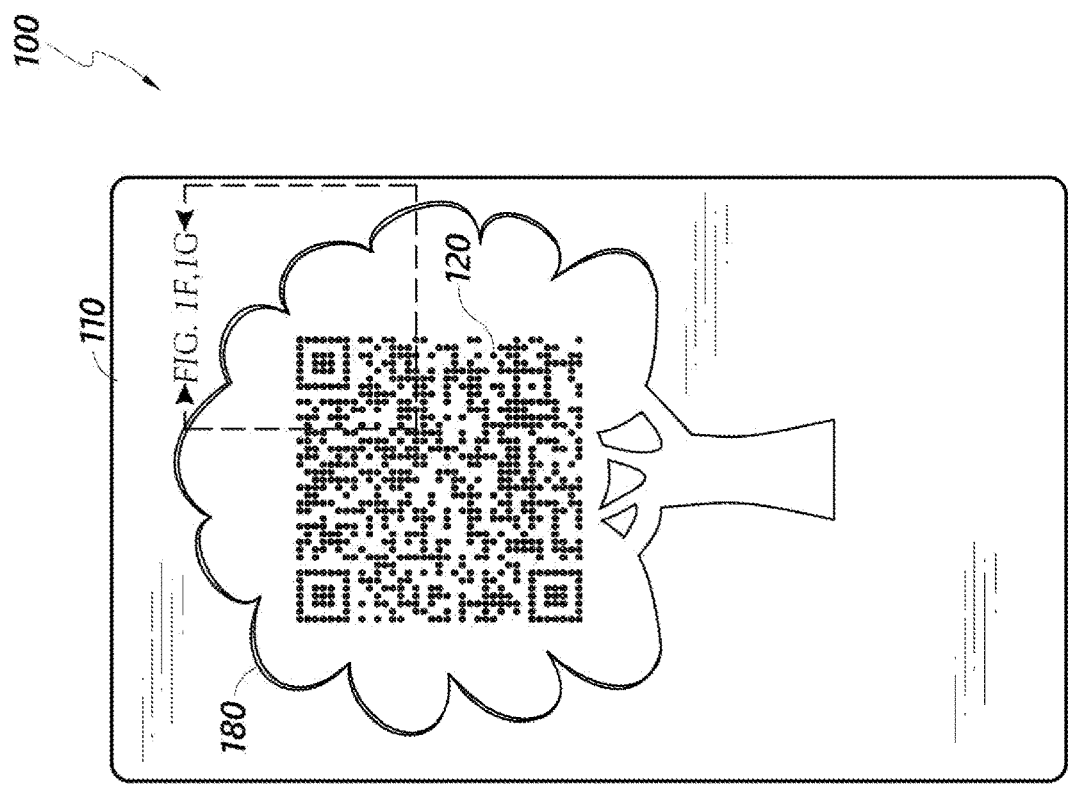

For instance, FIG. 1E depicts a glyph 120 as well as a border 180. In the depicted embodiment, the glyph 120 is a QR code configured to encode data containing a URL. Likewise, the border 180 includes a plurality of lines configured to encode data. In some embodiments, the glyph 120 and the border 180 may encode the same data. In this advantageous configuration, the information associated with the glyph 120 can be decoded even if it becomes damaged, since the border 180 can still be read, and vice versa.

Figure 1G:
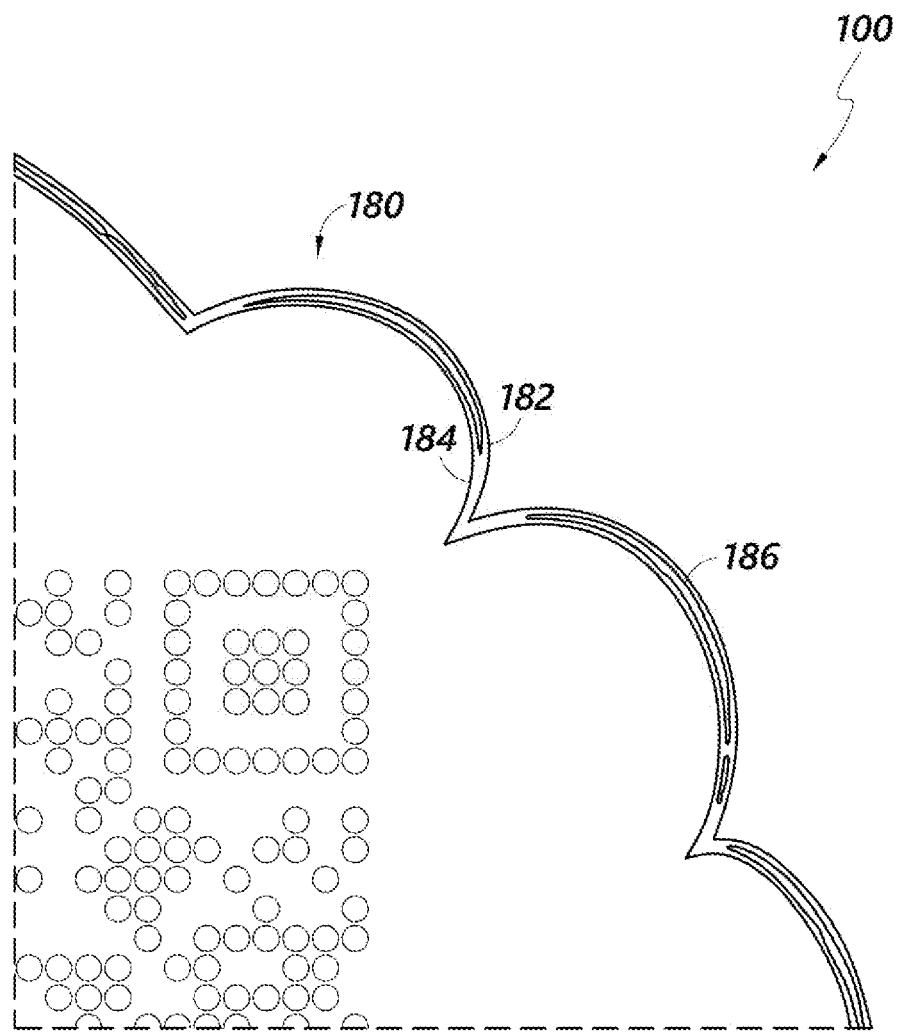

FIG. 1F shows a detailed view of the glyph 120 as well as border 180. As shown, border 180 includes a plurality of lines comprising a first line 182 and a second line 184. The spacing between the first line 182 and a second line 184 can be altered to encode data. One skilled in the art will understand that in other embodiments, various other visual or digital means can be used to encode data on or within the boarder. FIG. 1G shows the same design having been printed on a laser printer, where deviations 186 from the design are visible on the printed copy. As will be explained herein, deviations 186 and other unique machine errors can be leveraged as a security measure to detect fraud, such as detecting an unauthorized copy of a secure unique glyph carrier.

As will be discussed below, the glyph 120 can be engraved through a variety of methods including CNC machines and laser systems. In various embodiments, the glyph 120 is located near an edge of the substrate 110 such that a label 130 may be affixed to the substrate 110 without obscuring the glyph 120. In some configurations, label markings 125 are present to indicate where a label may be placed. As illustrated in FIG. 1B, the label markings 125 may be included proximal to the glyph 120. However, it will be appreciated that label markings 125 may be disposed at other locations on the substrate 110 as well.

In some configurations, the glyph 120 is a binary matrix, such as a QR code. A variety of method exist for generating QR codes, such as the open-source software qrcode 6.1 available at https://www.pypi.org/project/qrcode/, the entirety of which is incorporated herein by reference. In certain configurations, the glyph 120 is a QR code configured to store a URL. The URL may have a pattern such as "https://qbar.systems/qqqqqqqqqq," where "qqqqqqqqqq" is an alpha-numeric, URL-safe code 32 characters long, such that the total URL length is 53 characters. In other implementations, the URL may be a 53-character URL configured to have a pattern such as https://qbar.codes/cc/qqqqqqq where "cc" is an ISO 3166-1 alpha-2 or alpha-3 country code and "qqqqqqq" is an alpha-numeric, URL-safe code. In this advantageous configuration, the data collected in each country can be separated and stored according to the laws of the relevant locality. For instance, data that is collected and subject to the European General Data Protection Regulation (GDPR) can be collected and stored in a manner that satisfies local regulatory schemes.

In certain implementations, the URL-safe code is generated based on the identity of a previously generated URL-safe code in combination with a cryptographic salt. The 53-character URL can be converted to a 33 px by 33 px matrix comprising 1089 binary pixels, the pixels distinguishable by one or more characteristics such as color, shade, depth, and the like. In various embodiments, the size of each pixel may range from about 0.375 mm to about 1.5 mm such as about 0.75 mm which yields a grid size of about 24.75 mm. However, it will be appreciated by those of skill in the art that variations in string length, total URL length, grid size, and pixel size are contemplated without deviating from the scope of the present disclosure.

In certain desirable configurations, glyph 120 contains a security modification. For instance, the glyph 120 may be a QR code containing a security modification where several pixels have been modified in a known manner. In some configurations, the modified pixels may be configured for machine recognition, but difficult to detect by eye. For instance, in certain embodiments, a security modification is made to the QR code such that 4 pixels have their values reversed. In certain configurations, the identity of the reversed pixels may be based on the identity of the salt used to generate the URL-safe code, as will be discussed below. For instance, the identity of the reversed pixels may bear a cryptographic or other connection to the identity of the salt. Nevertheless, it is not necessary that the number of pixels altered is 4. It will be understood by those of skill in the art that a wide range of number of pixels may be altered in a variety of manners without deviating from the scope of the present disclosure. For instance, in addition to reversing the value of one or more pixels, the depth of the engraving may also be altered. Alteration of pixels as described herein does not render the QR code unreadable. For instance, in some embodiments the number of pixels modified does not exceed a selected error correction threshold of the QR code or other glyph, such as about 7%, about 15%, about 25%, or about 30%. In various configurations, an error correction of about 15% is used.

In various embodiments, a label 130 may be included. The label 130 may be included for the purposes of branding, identification, marking, differentiating a QR code carrier from another, or for another purpose. For instance, the label 130 may display a business's name, logo, or may display the program that the QR code carrier is configured to initiate, such as "Login" or "Menu." In some embodiments, the label 130 may be a vinyl adhesive label, such as a matte vinyl adhesive label. In some embodiments, the label 130 may be a chalkboard style sticker, such as a matte black vinyl adhesive sticker. As shown in FIG. 1C, the label 130 may be configured to partially or completely surround the glyph 120. In other configurations, the label 130 may be placed beneath the glyph 120, or in any location on the substrate that does not cover an excessive portion of the glyph 120 such that the glyph 120 can no longer be scanned or otherwise read. In some embodiments, the label may be about 44.45 mm in width by about 25.4 mm in height.

Despite the customizability provided by the label 130, it is not necessary that the secure unique QR code carriers be presented as a customer facing aspect of a business. For instance, in various configurations, the secure unique QR code carriers may be implemented as a proof of purchase system. By way of example, a business may maintain the secure unique QR code carriers out of customer view, such as within a safe. In such an embodiment, the business may generate their own QR codes to be displayed to customers. In this manner, the original secure unique QR code carriers may be presented if a dispute were to arise. For instance, in one example scenario, a vendor may produce two copies of a secure unique QR code carrier but be limited to uploading only a single high-resolution image of the secure unique QR code carrier. In this example, the vendor may sell two copies of the secure unique QR code carrier to two separate businesses. A dispute may arise as to which business is the rightful owner of the secure unique QR code. In this example, the two business owners may provide their own high-resolution images of the respective businesses' QR code carriers. Since the vendor may upload only a single high-resolution image of the secure unique QR code carrier, only one of the businesses' QR code carriers will match the image uploaded by the vendor. In this manner, the QR code carrier that does not match the image uploaded by the vendor may be disabled, the owner of the disabled carrier may be reimbursed, and in various configurations, the vendor may be barred from producing further secure unique QR code carriers.

As depicted in FIG. 1D, the system 100 may further include a base 150. The base 150 may be manufactured from the same or different material as the substrate 110. The base may have a thickness ranging from about 0.375 mm to about 1.5 mm, such as about 0.75 mm. In some embodiments, the base 150 has a thickness of about 1.587 mm so that the substrate 110 and base 150 may be placed together and inserted into a wallet. In some configurations, the base 150 may include a slot 160. The slot 160 can be a slit engraved in one or more surfaces of the base 150, the slot 160 having a length and thickness about equal to one or more edges of the substrate 110. In some embodiments, the slot 160 may penetrate completely through the thickness of the base 150 or form an indentation in the base 150 that does not penetrate all the way though. In this manner, the slot 160 can be configured to interface with one or more edges of the substrate 110 in order to orient the substrate 110 in a substantially vertical position to facilitate scanning of the glyph 120. In various configurations, the slot 160 is configured to allow the substrate 110 and glyph 120 to be presented to a user at a predetermined angle. For instance, as depicted in FIG. 1D, the slot 160 is horizontally engraved on the longitudinal axis of the base 150, and perpendicular to the top surface of the base 150, such that the substrate 110, when inserted into the slot 160, is positioned at about a 90° angle to the base 150. In other configurations, the substrate 110 may be inserted through the base 150 via slot 160, such that an edge of the substrate 110 protrudes beneath the base 150 thereby increasing or reducing the viewing angle of the substrate 110 when placed on a surface.

Figure 2B:
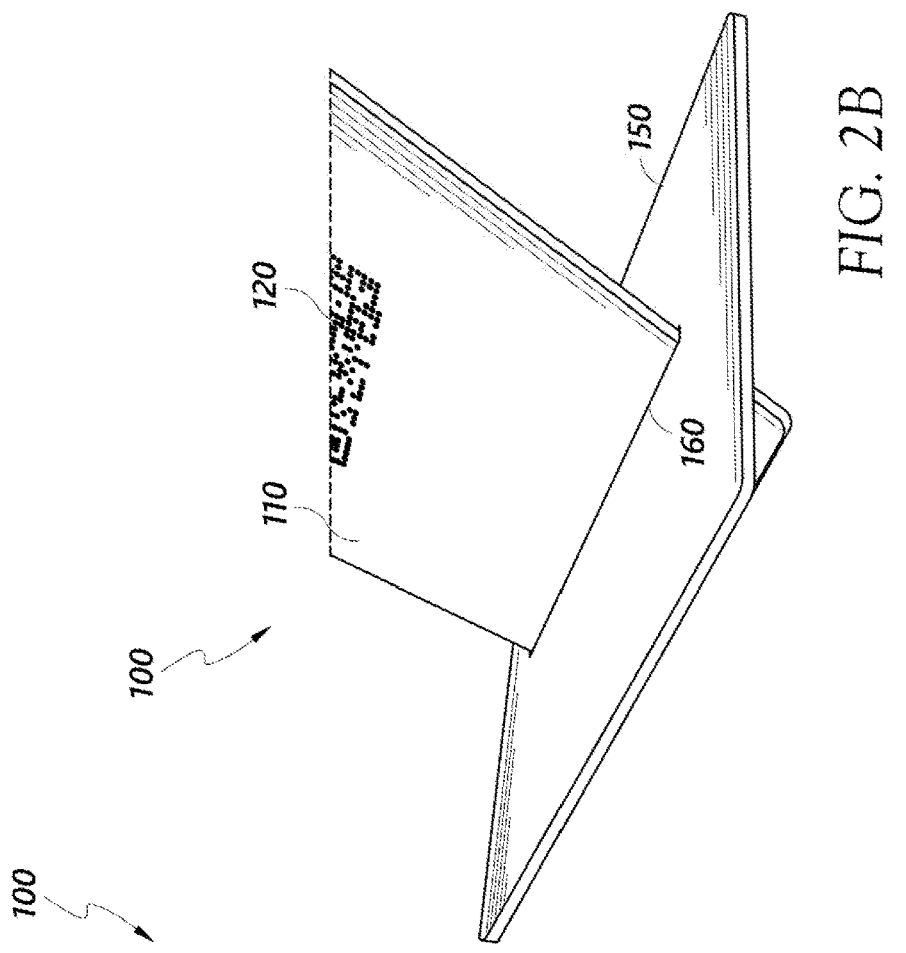
FIGS. 2A-C depict a secure unique QR code carrier system in various operational configurations prepared in accordance with certain embodiments of the present disclosure.
Figure 2A:
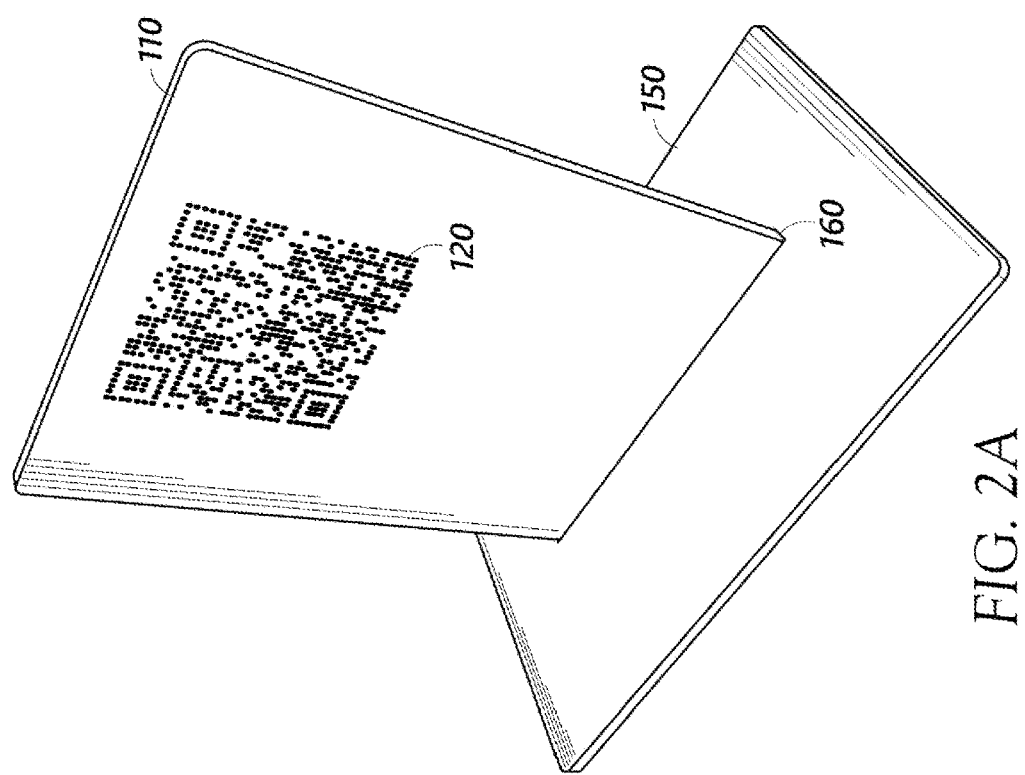
Figure 2C:
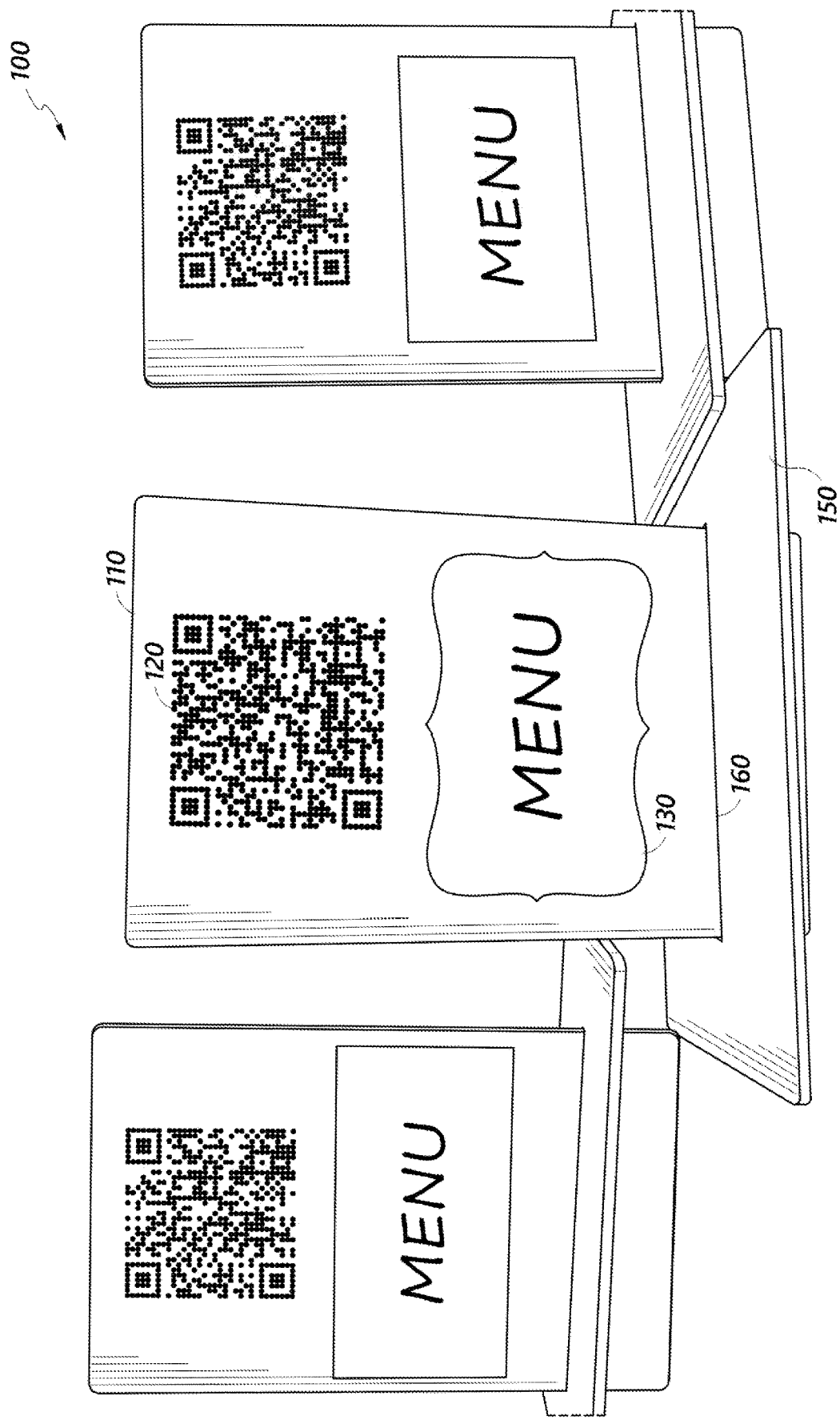

FIGS. 2A-C are depictions of a secure unique QR code carrier system 100 in various operational configurations. As shown in FIG. 2A, the secure unique QR code carrier system 100 includes a QR code carrier substrate 110 and a glyph 120. The QR code carrier substrate 110 interfaces with a base 150 via slot 160. As shown in FIG. 2A, the QR code carrier substrate 110 is oriented substantially vertically. FIG. 2B depicts a QR code carrier substrate 110 interfaced with the base 150 via slot 160, where the QR code carrier substrate 110 penetrates through the base 150 via slot 160. In this manner, the QR code carrier substrate 110 is oriented such that a glyph 120 is presented with a slight upward angle to facilitate scanning. FIG. 2C depicts an assortment of QR code carriers including a substrate 110, a glyph 120, a base 150 having a slot 160. In the embodiment depicted in FIG. 2C, each QR code carrier further includes a label 130. The label 130 may be adopted to fit a wide variety of aesthetic standards, and in some embodiments, may be a matte black adhesive vinyl to facilitate labeling the QR code carriers. In the present illustration, the label 130 indicates that the QR code carriers are associated with a menu, for example a menu in a restaurant or shop.

Methods of Manufacturing Secure Unique QR Code Carriers

The glyph may be engraved through a variety of methods. By way of example, in one embodiment, a laser engraving system such as a $CO_2$ laser, is used to ablate the surface of the polymer substrate to yield a series of indentations in the surface of the substrate in the pattern of the desired glyph. In some embodiments, the laser may be used to ablate one or more portions of a cap layer of a microsurface impact acrylic to reveal the core layer beneath. In certain configurations, the cap layer and the core layer of the microsurface impact acrylic are distinguishable by features such as color, facilitating identification of the glyph engraved thereon. In still further configurations, a CNC machine is used to engrave the glyph.

The machining processes used to engrave the substrate involve the use of a computer to control one or more servomechanisms through a predetermined route to imprint, engrave, or otherwise impress the glyph onto the substrate. Each engraving process is sensitive to minute environmental fluctuations, such as ambient temperature, pressure, machine resolution, machine wear, electrical current, and the like. These unique environment fluctuations in combination with the advantageous physical properties of the substrate result in unique machining imperfections on the substrate. The unique machining imperfections, also referred to herein as unique machine errors may include misoriented pixels, displaced pixels, burrs, indentations, scratches, and the like. The unique machine errors can be used to distinguish two purportedly identical substrates carrying purportedly identical glyphs. For instance, in certain configurations the unique machine errors can be captured using a high-resolution photograph. In various desirable configurations, the high-resolution photograph may have a spatial resolution higher than the printing resolution of the engraving machine. This high-resolution photograph can later be used to distinguish the unique, secure QR code carrier from forgeries.

Methods of Securely Generating Unique QR Code Carriers

Many manufacturing facilities are optimized to create a large volume of identical items. As such, it can be difficult to produce a high volume of unique items—such as secure, unique QR code carriers—at a single location. However, distributed manufacturing mechanisms can introduce security concerns, such as vendors producing unauthorized QR code carriers, producing duplicate QR code carriers, producing QR code carriers duplicated by another facility, exceeding their quota of allotted QR code carriers, among others.

Disclosed herein are additional security features that can facilitate distributed manufacturing of a large volume of unique items while preventing individual manufacturers from generating duplicate URLs, codes, or exceeding their manufacturing quota. For instance, in various embodiments the secure unique glyph carriers described herein may be manufactured in volume in large facilities and also through distributed manufacturing among a plurality of individuals, hobbyists, or smaller manufacturing shops. In this manner, even a single individual can manufacture and sell the secure unique QR code carriers disclosed herein.

By allowing distributed manufacturing of a large volume of unique items, the systems disclosed herein provide significant advantages over traditional systems. For example, where a small or local business requires a handful of secure unique QR code carriers, the business may contract with an individual hobbyist or small manufacturing shop co-located in the business's area, such as within the same neighborhood, city, state, or the like. In this fashion, the manufacturer is more likely to be aware of the struggles and obstacles faced by small businesses in the area and is also better able to work with the business to determine what type of customization or branding may be necessary, or what type of software, programs, program templates, finite state machines, or the like may be useful to the business.

Figure 3A:
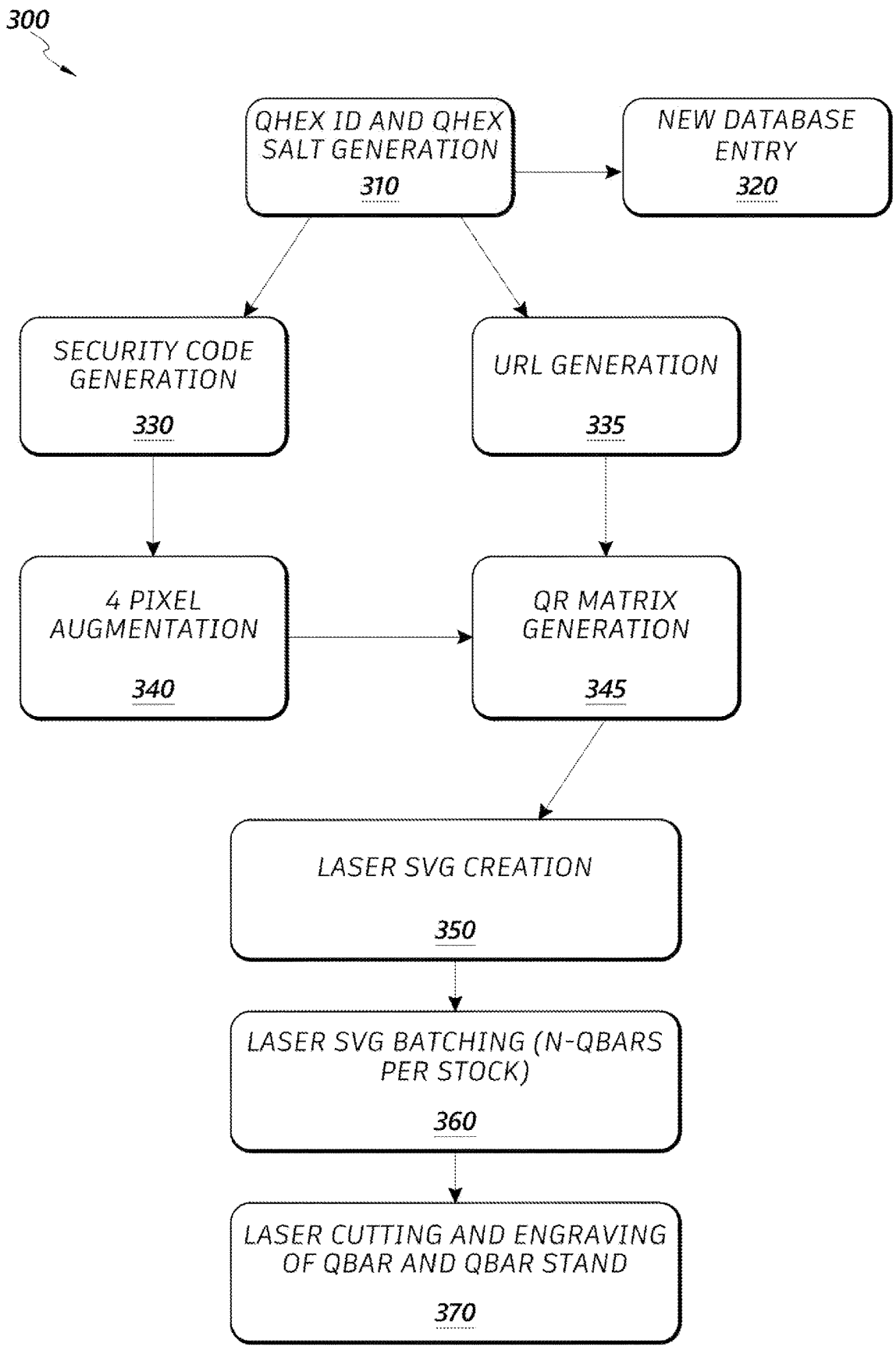

FIG. 3A is a flowchart that depicts a method 300 for manufacturing a secure unique QR code carrier in accordance with certain embodiments of the present disclosure. In some embodiments, the method 300 includes generating a URL from a previously generated URL in combination with a cryptographic salt to yield a QR code having a security augmentation based on the cryptographic salt. For convenience, the present example is discussed with respect to a 2-dimensional QR code. However, it will be appreciated by those of skill in the art that the techniques and methods described herein may be applied to engrave other types of glyphs as well, including glyphs readable in 1, 2, or 3 dimensions.

At step 310, the system implementing the algorithm generates a new QHex ID and new QHex salt. As will be explained below, the QHex ID may be a representation of a cryptographic digest. For instance, the new QHex ID can be obtained by hashing the previously generated QHex ID along with the previous QHex salt and the new QHex salt to yield a new QHex digest. In other configurations, a QHex ID can be obtained by hashing the previously generated QHex ID along with the new QHex salt to yield a QHex digest. In various implementations, the QHex ID may consist of URL safe characters and be and limited to 32 characters. A new QHex salt can be a randomly selected string. In some embodiments, the randomly selected string begins with a predefined character, such as beginning with "q." The algorithm checks whether the previous QHex ID, previous QHex salt, and new QHex salt will be hashed to yield a digest that starts, ends, or both starts and ends with one or more predefined bytes, such as byte "00." The Blake2 hashing algorithm is suitable, though a variety of hashing algorithms can be employed without deviating from the scope of this disclosure. In some embodiments, a timeout may be employed to cause the algorithm to exit the method if a suitable new QHex salt yielding a suitable digest is not found within a given timeframe. For instance, in some configurations, a third-party engine such as Google App engine may be employed to perform the calculation, and a time limit of about 60 seconds may be imposed. In the event of a timeout, an empty QHex ID and QHex salt can be returned, and a new request may be made. Once a suitable new QHex salt is identified, the new QHex ID is generated based on the digest, and the method proceeds to step 330 and 335. In the algorithm depicted in FIG. 3A, the QHex ID will become public while the QHex salt will remain private. The newly generated QHex ID and QHex salt are entered into a database at step 320.

At step 330, a security code is generated. The security code is based on the QHex salt. A variety of methods may be employed to generate a security code. For instance, in some embodiments, a selection of characters may be obtained from the QHex salt to serve as the security code. As one example, a string of the first four consecutive characters may be selected from the QHex salt to serve as the security code. However, it will be appreciated that other numbers of characters and other selections may be employed without deviating from the scope of this disclosure. For instance, non-consecutive characters may be selected from any position within the string. In other embodiments, the string may be modified before a selection is made. For instance, the QHex salt may be hashed, and a series of consecutive or non-consecutive characters may be selected from the QHex salt digest.

At step 335, a URL is generated based on the QHex ID. Although the URL is based on the QHex ID, the URL appears random, making it more difficult to guess a valid URL. As depicted in FIG. 3A, the URL is generated by encoding the QHex ID into base64, and appending the result to a subdomain, such as https://qbar.systems/[QHex ID].

At step 340, a 4 Pixel Augmentation is generated based on the identity of the security code. In one embodiment, four consecutive characters are selected from a predetermined position within the QHex salt, and their index is sorted. By way of example, if the four consecutive characters selected from the QHex salt consist of "d, c, b, a," their index may be sorted to yield the sequence [3, 2, 1, 0]. This sequence may be used to generate the 4-pixel augmentation by preparing instructions to reverse the fourth pixel on the first column, the third pixel on the second column, the second pixel on the third column, and the first pixel on the fourth column of a QR Matrix. In the present example, if the fourth pixel on the first column were to be generated into a QR Matrix as black, then the 4-pixel augmentation would reverse the fourth pixel on the first column to be white.

The 4-pixel augmentation can be used to ensure that the URL, and subsequent glyph were generated with knowledge of the associated QHex salt and corresponding security code. As such, even if a valid URL were guessed and printed into a glyph, the glyph would not contain the proper 4-pixel augmentation based on the security code, which is in turn based on the QHex salt used to generate the authentic QHex ID, significantly increasing the complexity of generating a forgery and facilitating the detection of unauthorized duplicates.

While the present implementation is described with reference to a 4-pixel augmentation, it is understood that a variety of augmentations can be made without deviating from the scope of the present disclosure. For instance, in various configurations a 1-, 2-, or 3-pixel augmentation may be implemented. In other configurations, more than 4 pixels may be augmented. For instance, about 1% of the pixels may be modified, or about 7%, about 15%, about 25%, about 30%, or any value therein. Further, it is not necessary that the characters selected be consecutive. In other embodiments, the characters selected may be at other locations within the security code, whether consecutive or not.

At step 345, a QR Matrix is generated based on the URL generated at step 335, and the QR Matrix is modified with the security modification of step 340 to yield a secure, unique QR code. A variety of methods exist for generating QR matrices based on a URL, such as the open-source software qrcode 6.1 available at https://www.pypi.org/project/qrcode/.

At step 350 a Laser Scalable Vector Graphic (SVG) is created based on the QR Matrix, and at step 360 the Laser SVG is batched into stocks, each stock containing a number (N) of secure unique glyph carriers where N can be the same for each stock or vary from stock to stock. The stock size is based on the production capacity of a given manufacturer, such that each manufacturer is assigned a batch of SVGs suitable for their production output and/or machine size. It will be appreciated that various files and formats may be used in addition to SVG files, and that the disclosure is not limited to SVG implementations.

At step 370 a substrate is obtained and engraved according to the Laser SVG of step 360 to yield an engraved secure, unique QR code carrier. In certain embodiments, the laser engraving device may be a $CO_2$ laser cutter, such as a BEAMO® laser desktop cutter, Glowforge® consumer laser cutter, or other commercial laser engraving devices. Although the embodiment illustrated in FIG. 3A uses a laser engraving device, one skilled in the art will understand that other engraving devices can be used. For example, a CNC machine with a SVG or similar type file could be used to engrave the QBar and QBar stand.

In various configurations, the secure, unique QR code carrier is visually inspected for quality assurance. In some configurations, deep learning and computer vision can be used to automate quality control and ensure each secure, unique QR code carrier is readable, and is otherwise of sufficient quality.

In some implementations, manufacturers of secure unique QR codes may monetize the process. For example, in the implementation depicted in FIG. 3A, vendors may elect to purchase or generate SVGs or similar files and engrave the stored patterns onto a substrate to yield secure unique QR code carriers, which can be sold to other businesses.

Figure 3C:
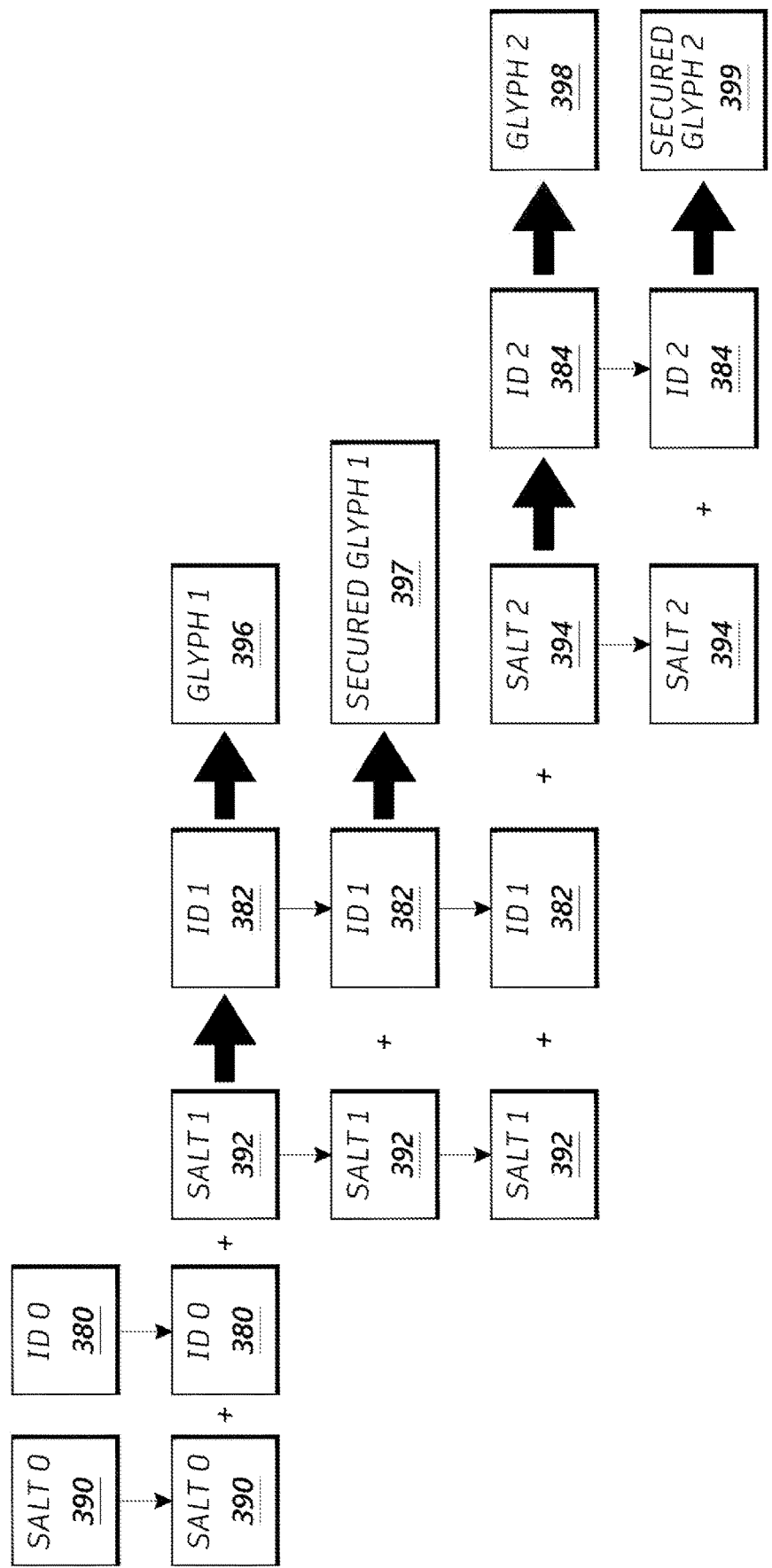

FIGS. 3B and 3C further depict methods for generating a series of connected glyphs, where each glyph is based on the preceding glyph. Specifically, each glyph within the series of connected glyphs may bear a cryptographic or other relationship to the previously generated glyph to prevent forgery, additions, or alterations of glyphs within the series. For instance, as shown in FIG. 3B, the method may start with the previously generated identification code ID 0 380. ID 0 380 may consist of URL safe characters and be and limited to 32 characters.

The method includes hashing ID 0 380 with a cryptographic salt, Salt 1 392. Salt 1 392 can be a randomly selected string. In some embodiments, the randomly selected string begins with a predefined character, such as beginning with "q." Hashing ID 0 380 with Salt 1 392 yields ID 1 382—a digest that starts, ends, or both starts and ends with one or more predefined bytes, such as byte "00." Once a suitable Salt 1 392 has been identified, the method includes generating Glyph 1 396, which can be a QR matrix or other pixel matrix glyph based on the identity of ID 1 382. In some embodiments, Glyph 1 396 can be augmented with a security modification based on the identity of Salt 1 392 to yield Secured Glyph 1 397. For instance, in some embodiments, ID 1 382 may include at least a portion of a URL and may be used to generate a pixel matrix, such as a QR matrix consisting of 1089 pixels distributed across 33 columns and 33 rows. In some embodiments, ID 1 382 may be appended to a subdomain to yield a URL which is then used to generate a pixel matrix or other glyph. The security modification to the pixel matrix or other glyph can be based on the identity of Salt 1 392. For example, the first four characters may be selected from Salt 1 392. In this example, the first selected character may correspond to the first column of the pixel matrix forming the glyph, the second selected character may correspond to the second column, the third selected character may correspond to the third column, and the fourth selected character may correspond to the fourth column. The value of each selected character may indicate in which row of the pixel matrix the modification shall be made. For instance, if the first selected character were "0" then in this example, the pixel in the first column of the first row would be reversed. In this manner, the resultant Secured Glyph 1 397 is based on the identity of the previously generated glyph and contains a security modification based on the identity of Salt 1 392 to ensure that the glyph was not generated outside the system. As depicted, the method may proceed where ID 1 382 is used as the previously generated identification code, along with a newly generated Salt 2 394 to yield ID 2 384—a digest that starts, ends, or both starts and ends with at least one predefined byte, such as byte "00." ID 2 384 may then be used to generate Glyph 2 398 which may be a pixel matrix such as a QR code. As described above, a security modification based on the identity of Salt 2 394 may be made to Glyph 2 398 to yield Secured Glyph 2 399.

In some embodiments, the previously generated salt may also be employed to generate the subsequent glyph for additional security. For instance, as shown in FIG. 3C, the previously generated ID 0 380 may be hashed with the previously generated Salt 0 390 along with a newly generated Salt 1 392 to yield ID1 382—a digest that starts and ends with a predefined byte, such as byte "00." Once a suitable Salt 1 392 has been identified, the method includes generating a pixel matrix based on the identity of ID 1 382 to yield Glyph 1 396. Glyph 1 396 may be augmented with a security modification based on the identity of Salt 1 392, as described above, to yield Secured Glyph 1 397. As depicted, the method may continue where ID 1 382 is used as the previously generated identification code, along with the previously generated Salt 1 392 to be hashed with a newly generated Salt 2 394 to yield ID 2 384—a digest that starts and ends with a predefined byte, such as byte "00." ID 2 384 may then be used to generate Glyph 2 398 which may be a pixel matrix such as a QR matrix. Glyph 2 398 can be modified in the same manner to contain a security modification based on the identity of Salt 2 394 as described above to yield Secured Glyph 2 399. In the foregoing embodiments, each of ID 1 382 and ID 2 384 may be appended to a domain and serve as a URL. Accordingly, when a glyph encoding the ID is scanned, the scanning device may decode the URL and route a device to the specified URL.

Methods of Assigning Ownership

Figure 4:
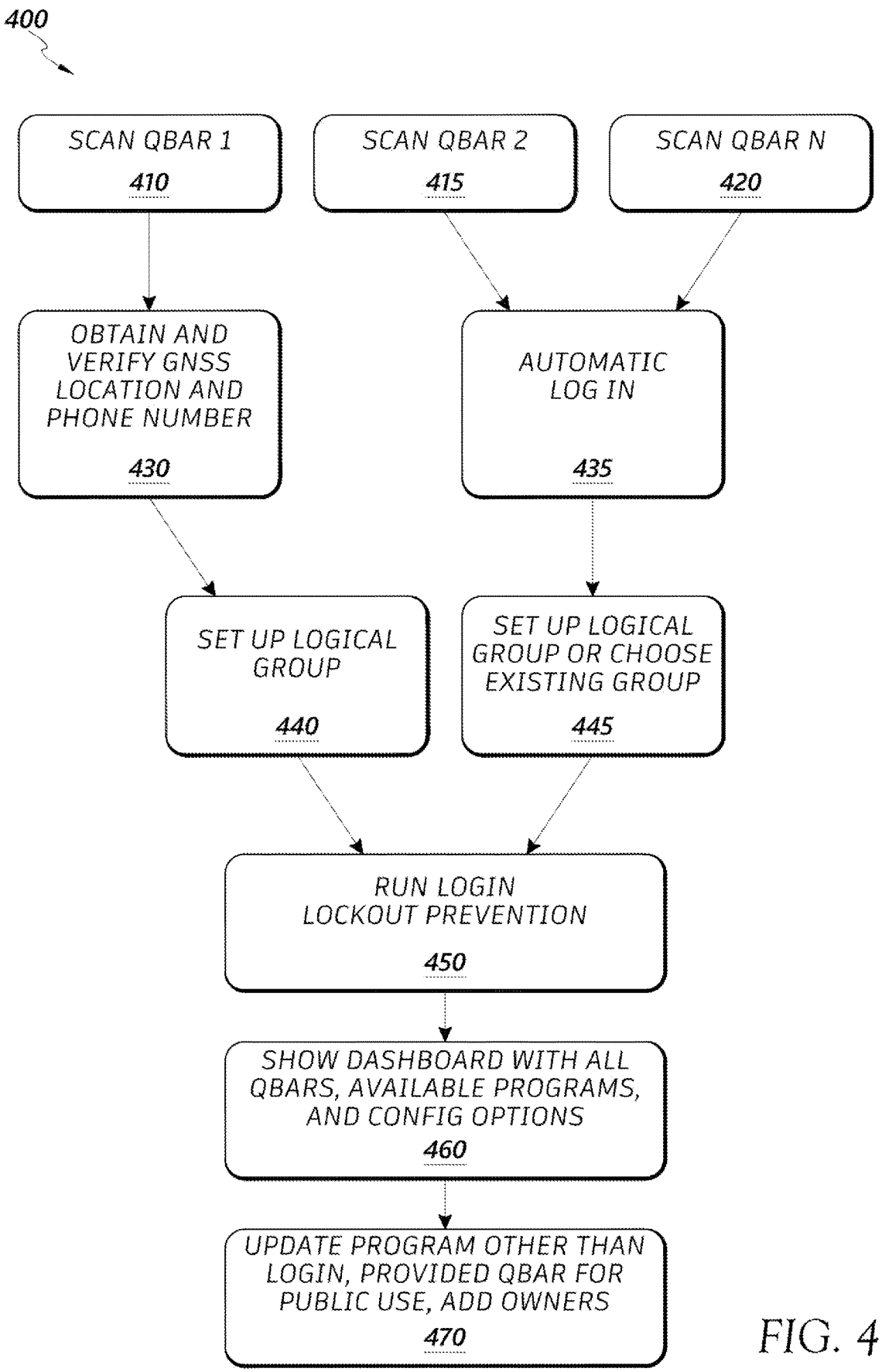
FIG. 4 schematically illustrates a method for initial authentication of secure unique QR code carriers in accordance with certain embodiments of the present disclosure.

FIG. 4 is a flow chart depicting a method of activating a secure unique QR code carrier 400 in accordance with the present disclosure. In the embodiment depicted in FIG. 4, any number N of secure unique QR code carriers, or QBars, may be authenticated.

The method 400 begins at step 410 where the first of N QBars is scanned. Upon scanning the first QBar, the method proceeds to step 430, where user identity information is obtained. In certain implementations, the user identity information is obtained by interrogating the scanning device. The user identity information may include information such as a location, a name, and a phone number. It will be appreciated by those of skill in the art that alternate user identity information may be used to verify the identity of the user, such as hand gestures, unique photos of objects known only to the rightful user, or other privacy preserving identification methods that do not require phone numbers, physical locations, addresses, or similar identifying features. In this manner, identities can be authenticated using photos of objects known only by the rightful user, or hand gestures known only by the rightful user to authenticate the user in a semi-anonymous manner and preserve the user's privacy. As depicted in FIG. 4, the location is obtained from a Global Navigation Satellite System (GNSS), though it will be appreciated that a variety of other location detection methods may be employed, such as analyzing a geographically local network environment to detect anchors having a known position. In certain advantageous implementations, the security features disclosed herein prevent theft and other unauthorized transfers of ownership. For instance, theft is discouraged and significantly complicated where user identity information, such as a phone number or hardware ID, are obtained by interrogating the scanning device, and where a potential thief would require access to the specific physical login QBar used to configure the initial ownership. In the same or different embodiment, location-based security features may be implemented as well. For instance, in some configurations, location information may be obtained from each scan, and scans detected outside a region of expected use can be blocked. Location information may include GPS, GNSS, network information, and the like.

Once the scanning user's identity has been established, the method proceeds to step 440 where the user may configure a logical grouping of one or more QBars. After a logical group of QBars has been created, the method proceeds to step 450, where Login Lockout Prevention logic is run. This logic requires that the last scanned QBar has the login program before allowing access to the Dashboard, in order to prevent unauthorized alterations to the functionality of authenticated QBars. As used herein, a QBar has the login program where the QBar causes a device to initiate the login program when scanned.

At step 460, the QBar and the scanning user have been authenticated, and the Login Lockout Prevention logic has determined that the last scanned QBar has the login program, and a Dashboard is displayed. The Dashboard displays information relating to all, or a subset of all, QBars associated with the user. The Dashboard may further display all available programs that a QBar may be configured to initiate when scanned, along with all available configuration options. The Dashboard can be displayed on the scanning device or on another device in communication with the device used to scan the QBar.

At step 470, a program that the QBar is configured to initiate when scanned can be updated such that the QBar will initiate a new or alternate program. In some configurations, such as the embodiment depicted in FIG. 4, safeguards may be implemented to prevent a user from updating the program the QBar is configured to initiate when scanned where the QBar is the initial login QBar. In this manner, QBars other than the login QBar may be configured to initiate a customer-facing program, such as providing a restaurant menu. These updated QBars may then be provided to the public. In the same or different embodiment, other configuration settings for the QBar may be altered. For instance, as depicted at step 470, additional owners may be added to the QBar. As used herein, a QBar owner is a user of a QBar having authority to modify one or more configuration settings of the QBar.

As shown in FIG. 4, it is not necessary to obtain the QBar owners phone number more than once. After the initial login is completed at step 430, subsequent QBars can be configured using an automatic login procedure. For example, at step 415 configuration of a second QBar begins by scanning the second QBar, where the method proceeds to step 435. At step 435, the user is automatically verified and logged in using the information obtained at step 430. As such, the method proceeds to step 445 where the user may set up a new logical grouping of QBars or add the second QBar to the logical group established at step 440. The method then proceeds to step 450, where the login lockout prevention logic is run. The method disclosed herein may be applied to authenticate any N number of QBars, as shown at step 420 by scanning each of the N QBars and following the process outlined above for QBar 2.

FIG. 5 depicts a screenshot of an implementation of a Dashboard 500 prepared in accordance with the present disclosure. The Dashboard 500 allows an owner of a QBar to sort their QBars into logical groups. As depicted, Dashboard 500 includes a first field 510. Field 510 allows a user to create a new logical grouping of QBars. In the embodiment illustrated in FIG. 5, field 510 reflects that a single logical grouping named "test" has been established. Dashboard 500 further includes field 520, which allows an owner to create or load a new program, such as "Basic Login," as depicted in the illustrated embodiment. Accordingly, new programs may be created according to a template as depicted at field 530. Field 540 allows an owner of a QBar to change the URL that a user will be directed to upon scanning the glyph engraved on the QBar.

As illustrated in FIG. 5, Dashboard 500 includes two QBars shown in rows 550 and 560, respectively. The QBar shown in row 550 belongs to the "test" QBar group. The QBar is configured to run "Basic Login #1" when scanned, as indicated in the Program Name column. The Program Template column shows that Basic Login #1 can be used to "Login to a basic control panel." Potential outputs of the Basic Login #1 program are displayed in the Program Values column, including a wrong owner message indicating that the QBar has already undergone an initial set up and has an owner assigned. The number of times the program has been run is depicted in the Program Runs column, which reflects that the login program has been run once. The Dashboard 500 also records the approximate and exact location where the program was executed, and the information may be accessed by clicking the hyperlinked text in the Program Location column. The QBar in row 550 is the login QBar, and as such, the Update Program column does not contain a checkbox allowing a user to redefine the login QBar's functionality, and instead displays the message 'Last Control QBar." However, the owner may disown the QBar by checking the appropriate box in the Disown column of row 550. The QBar of row 550 belongs to an owner identified by the phone number "+1 844-448-5504."

Likewise, Dashboard 500 displays information relating to a second QBar, displayed in row 560. The second QBar displayed in row 560 also belongs to the "test" group. The second QBar is configured to run "Basic Login #2" when scanned. This program is configured to redirect all scanners to a specified URL, as shown in the Program Template and Program Values column. It can be seen that the second QBar has not yet been scanned and the Basic Login #2 program has not yet been run, since the Program Runs column indicates 0 runs. Information pertaining to where the program was last executed would be accessible under the Program Location column. In contrast with the first QBar, the second QBar has a checkbox in the Update Program column. A user may update the program that the second QBar is configured to run by checking the box in the Update Program column and pressing update button 570. The second QBar is owned by the same owner as the first QBar, identified by the phone number "+1 844-448-5504."

In various embodiments, a marketplace may be implemented or used to distribute finite state machines, programs, or program templates along with other information, such as information relating to the ecosystem of secure unique QR code carriers. Such information may include advertisements, offers for services, promotions, tips, and the like.

Configuration and Recordkeeping of Secure Unique QR Code Carrier

In various configurations, the secure unique QR code carriers described herein allow traditional brick and mortar stores to record operational data similar to their online counterparts. For instance, in certain configurations, the systems and methods disclosed herein can be used by business owners to introduce a series of action and interaction checkpoints through which customer interactions can be recorded. In some embodiments, the additional record keeping enabled by the secure unique QR code carriers can be utilized to provide data that can help grow the business and improve customer interactions, such as by facilitating A/B and A/A testing.

It is common for online businesses to record all customer interaction data from a time a customer first visits a site. In this manner, online businesses are able to accumulate a vast array of customer interaction and clickstream data which can be mined to understand how a business's products are used and what aspects are important to consumers. Traditional brick and mortar retail stores often do not have access to such robust consumer interaction data because customer interactions are often transient and untracked, the data is unavailable, and even if some of the data could be gathered using sensors and cameras, the data would be incomplete and too cumbersome to analyze through traditional methods. Herein, systems and methods for introducing a series of action and interaction checkpoints that can record customer interaction are disclosed.

Customers interact with physical businesses by gathering information that helps them complete a task or purchase. For example, customers obtain menus from restaurants, business cards from service providers, pamphlets with product information, and the like. These interactions are frequently transient and cannot be mined for data to inform future decision making.

In some embodiments, the secure unique QR code carriers described herein can be arranged into a system of action and interaction checkpoints. Customers may interface with the action and interaction checkpoints, and the activity may be logged or otherwise recorded. As used herein, action checkpoints refer to substantially one-way relationship between a consumer and a store. For instance, a customer walking down an aisle may be considered an action checkpoint as the term is used herein. Conversely, interaction checkpoints refer to two-way interactions between a consumer and a store. By way of example, after walking down an aisle, a customer may locate the item they wish to purchase and scan a secure unique QR code carrier to call for assistance transporting the item. Likewise, a restaurant may deploy an interaction checkpoint in the lobby where customers may scan the secure unique QR code carrier and receive a menu from the restaurant.

Each exchange with an action or interaction checkpoint may be logged. The log may be in a local or remote database. The log may include many variables relating to the customer interaction. For example, the log may include information relating to the customer that interacted with the checkpoint, such as a hardware ID, name, or phone number; the type of configuration and unique code for configuration settings of the secure unique QR code carrier; the time of the scan; the time since a previous scan; the location of the scan; the time since the last checkpoint was encountered; the duration of the interaction, the duration spent at a given checkpoint, and the like.

In various configurations, employees and customers may interact with action or interaction checkpoints, and these exchanges can also be logged. For instance, in various configurations restaurants may leverage interaction checkpoints to mark the start and end times of cooking; the time before a meal was brought to a table; and the like. It will be appreciated that the granularity of a business's data retention practices will be related to the granularity and number of action and interaction checkpoints deployed throughout the premises. Moreover, each action and interaction checkpoint can be unique by tying the checkpoint to a secure, unique QR code carrier. Since each QR code carrier is unique and configured to record and store information pertaining to each scan, it is possible to monitor individual customer interactions without pre-registering or otherwise pre-identifying individual customers.

The additional record keeping enabled by the series of action and interaction checkpoints can be used to expand and empower a business's analytics practices. Some of the analytics that can be performed on the customer interaction logs include: geospatial analysis, temporal analysis, future volume of sales prediction, percentage of returning customers, detecting whether customers visit multiple locations of a store, A/B testing, A/A testing, and the like.

The analytics provide several advantages to retail stores. For example, restaurants may leverage the analytics to detect when a customer is a first-time visitor or frequent patron. Returning customers, identified by a scan of a secure unique QR code carrier, can be asked to rate their experience and provide feedback. Positive and negative customer interactions can be recorded and analyzed by reviewing the action and interaction checkpoints triggered by the customer, employees, and even other customers during the visit. This information can be mined to improve a business's practices.

The analytics can enable a store or company to track their inventory and products. For instance, although some carriers place codes on packages to be scanned and tracked in transit, these codes are carrier specific and cannot be scanned by the end user in the same way. Conversely, by implementing the system disclosed herein, a code may be placed or printed on a package, and the code may be scanned and further utilized by the customer after the package is received. For instance, the customer may scan the code to reveal where the package had arrived and been scanned during its journey, and the customer may further customize, alter, or otherwise modify the utility of the code upon receipt.

The analytics can further facilitate rapid A/B testing. For instance, in some configurations a new menu item may be presented to a selection of customers. Customers, including the selection of customers, may be asked to rate their experience and this data may be used to gauge the performance of the menu item. For example, based on data collected through use of the secure unique QR code carriers, the restaurant could track whether the new menu item was offered on the menu provided to a particular customer, whether that customer ordered the new item, and tailor any review questions based on what was offered to the customer and what the customer ordered. Further, the restaurant could track how the customer rated his/her overall experience and query them as to why they did or didn't order the new menu item, and how they liked the new menu item if ordered. The user experiences of customers that were offered the item may be compared to the user experiences of customers that were not offered the item, and the business may use this data to determine whether the item tends to improve a user's experience. Likewise, a business may employ the techniques and methods disclosed herein to facilitate A/A testing as well. For instance, a restaurant may A/A test consumer responses to two identical menus to verify that there is no statistically significant difference in feedback between the response of consumers who received the identical menus.

In order for the analytics to be accurate and helpful, businesses can be permitted to customize the particular action and interaction checkpoint system deployed at any particular premise. For instance, in one embodiment, a restaurant may utilize secure unique QR code carriers to provide menus to customers, and each secure unique QR code carrier may include all of the restaurant's menus—including a breakfast menu, lunch menu, happy hour menu, dinner menu, and dessert menu. In an alternate embodiment, a restaurant may implement a more granular system where each type of menu is provided on a subset of secure unique QR code carriers such that a subset of secure unique QR code carriers will be scanned to provide a breakfast menu while a different subset of secure unique QR code carriers will be scanned to provide a dessert menu. In still additional embodiments, a restaurant may implement a system of secure unique QR code carriers that provide a predetermined menu when scanned at a predetermined time. For instance, customers scanning a secure unique QR code carrier between the hours of 9:00 AM and 11:00 AM may receive a breakfast menu, while the same secure unique QR code carrier will provide a lunch menu if scanned between the hours of 11:00 AM and 4:00 PM. In still further embodiments, a restaurant may implement a system in which a secure unique QR code carrier will provide a happy hour menu when scanned in proximity to a bar location, while the same secure unique QR code carrier will provide a breakfast, lunch, or dinner menu when scanned within a dining area. As will be appreciated, the granularity of business reporting and insight can be related to the granularity of the secure unique QR code implementation. Advantageously, at any time a business can update the preferred action to take when a given secure unique QR code carrier is scanned.

Certain Methods of Scanning a Secure Unique QR Code Carrier

In various embodiments, the secure unique QR code carriers disclosed herein can be configured to initiate a wide array of actions when scanned, and the actions can be updated at will by the owner of the secure unique QR code carrier. In some implementations, the functionality is enabled through the use of one or more finite state machines, which can also be referred to herein as programs or program templates. For instance, in certain configurations the secure unique QR code carrier may be configured to point to a URL. The URL may be constructed according to a variety of paradigms. In one embodiment, the URL may be constructed according to the format: https://qbar.systems/qqqqqqq, where qqqqqqq is an alphanumeric URL safe code, such as an identification code which may be a cryptographic digest resulting from hashing a previously generated identification code with a new salt.

The URL can be configured to serve as an interface with a finite state machine. The finite state machine may include one or more computerized systems, local or remote to the business. In some configurations, the finite state machine may include cloud-based systems. The finite state machine can be configured to initiate a wide array of actions based on the particular configuration chosen by the owner of the secure unique QR code carrier. Further, the particular action initiated can be updated by the owner of the secure unique QR code carrier by updating the behavior of the finite state machine. For instance, in some embodiments the finite state machine can be configured to initiate POST requests, such as to enable control of smart devices or other internet of things (IoT) technology. In other configurations, the finite state machine can be configured to generate an invoice, such as a PayPal® or Stripe® invoice. For instance, a secure unique QR code carrier configured to send invoices may be scanned to send an invoice to an invoice secure unique QR code carrier. When the invoice secure unique QR code carrier is scanned, the scanner will receive an invoice thereby establishing a touchless point of sale. In still further configurations, the finite state machine can be configured to provide a questionnaire or other survey to scanners. For instance, the finite state machine can be configured to detect that a customer is a repeat customer, and to serve surveys to repeat customers. In some configurations, surveys may be sent randomly to customers upon the completion of action or interaction checkpoints, or random surveys may be sent along with invoices to facilitate data collection.

In some embodiments, the secure unique QR code carriers described herein can be used to facilitate payments between two parties. For example, a first secure unique QR code carrier can be used as a point-of-sale device. A second user, having a second secure unique QR code carrier, may then scan the first secure unique QR code carrier with a scanning device to establish an ongoing transaction between the first and second user. In some embodiments, a finite state machine, program, or program template may be used to control the flow of funds between the two users to ensure that the funds are transferred to the right users under the appropriate circumstances, as defined in the finite state machine, program, or program template.

Various implementations of finite state machines can provide security functionality as well. For instance, in certain configurations, secure unique QR code carriers can be configured to only be scanned within certain areas. For instance, within 100 m of a restaurant. Other geospatial limitations can be imposed. In some embodiments, the QR code can only be scanned within a locality, such as a neighborhood, city, county, state, country, continent, or global region.

The QR codes can further be configured to only be scanned during select times. In certain configurations, QR codes can be configured to only be scanned during business hours, or a subset of business hours. For instance, a restaurant owner may only allow the QR codes to be scanned while the restaurant is open, or only allow happy hour QR codes to be scanned during happy hour. Likewise, in the same or different embodiment, one or more QR codes could be configured to only be scanned during non-business hours or return one URL during certain periods of time (e.g., during business hours) and a different URL during other periods of time (e.g., during non-business hours). For instance, a barber shop may wish to display a "Sorry we missed you" screen when scanned during non-business hours.

The scanning devices can be configured to detect various alternate identification features as well. For instance, the computing system of FIG. 7 can be implemented as a scanning device, where the optical interface 740 is configured to perform a scan of a glyph, such as a QR code. However, the optical interface 740 can also be configured to identify or recognize other identifying features or actions as well. For instance, in some embodiments, the optical interface 740 is configured to receive hand gestures. The computing system 700 can also be configured to receive additional authenticating data, such as to receive a photograph through one or more of the optical interface 740, user interface 750, and communication interface 770.

Similarly, secure unique QR code carriers can be used to remotely control devices. For example, an "internet of things" device or another smart device configured to be remotely activated. In one embodiment, geo-temporal toggle switches can be implemented to improve the security of such devices. For instance, a smart device may be configured to activate or deactivate when a secure unique QR code carrier is scanned, and an activation URL is visited. To improve security of the smart device, the secure unique QR code carrier can be assigned a ruleset to only provide the activation URL when certain conditions are met, such as the identity of the scanner, the time of the scan, and the location of the scan. In some embodiments, the activation URL may only be provided to a certain specified user scanning the secure unique QR code carrier between 9 am and 5 pm when within 20 meters of the secure unique QR code location.

In some embodiments, the functionality provided by various finite state machine configurations can be monetized. For instance, some program templates can be free or available for purchase by owners of secure unique QR code carriers. Paid programs can be determined by analyzing cloud compute and storage patterns. For instance, in certain configurations, access to paid program templates may be provided where a monthly or yearly subscription provides access to programs requiring a certain level of cloud compute time or storage space. For instance, a basic reporting user interface (UI) may be provided at no additional cost where an owner of one or more secure unique QR code carriers may view certain statistics, such as scan frequency, while a premium or paid reporting UI may provide additional statistics, such as scanning user identity, scan location, scan frequency over time, repeat visit listing, predictive analytics, A/B testing, local business ads, the ability to trade or sell scan usage statistics, programs providing tutorials for configuring systems of secure unique QR code carriers, and the like.

In still further implementations, vendors, individuals, users, businesses, or others may create their own programs, program templates, finite state machines, or other logical arrangements and list them for sale to others, such as owners of secure unique QR code carriers. For instance, in various configurations, individuals, users, or businesses may create new programs that leverage the secure unique QR code carriers described herein. The new programs can be made available to freely download or to purchase. For instance, programs created by individuals, users, or businesses may be made available through at least one digital storefront, marketplace, or app ecosystem. By way of example, a data analyst may write a custom program or program template that provides owners of secure unique QR code carriers with enhanced data analytics.

Other programs may be created to facilitate anonymous, semi-anonymous, and pseudo-anonymous interactions. In one embodiment, the QR code carriers described herein can be used to initiate digital interactions with varying degrees of anonymity. For instance, a secure unique QR code carrier may be placed on the hood of a vehicle for the owner of the vehicle to scan. Upon scanning, the QR code carrier may link the scanning device to a webpage containing an anonymized messaging service. On this webpage, the owner of the vehicle and the owner of the QR code carrier may communicate with one another without the identity of either party being revealed. In a similar manner, the secure unique QR code carriers disclosed herein can be leveraged to implement a bulletin board system with varying degrees of anonymity. For instance, in some implementations of a bulletin board system the reader may be anonymous while the post author is identifiable; the reader may anonymously leave a response to the post owner; the reader may be identifiable while the post author is anonymous; or both the reader and author may be anonymous or identifiable. For instance, a neighborhood may implement an anonymized bulletin board system to allow neighbors to communicate with a degree of anonymity.

In still further configurations, the systems and methods disclosed herein can facilitate a variety of public, anonymous, semi-anonymous and pseudo-anonymous geo-temporal coordination computing. For instance, in one embodiment, a geo-temporal group can be formed between a first and second user where the first user scans a first QR code with a scanning device at a first specified time and location. The second user may scan the second QR code at a second specified time and location. In this manner, the first and second user, along with the corresponding QR codes, can form a closed geo-temporal group where the first and second users, along with the first and second time and locations, are loosely associated with one another. The first and second users may transfer or abandon the QR codes used to enter the group, and the first and second users may decide whether to reveal their identities since the first user's QR code, the first user's scanning device, and the first user's time and location of scan tie the first QR code to the first user. In this manner, the first user is distinguishable from the second, and vice versa. Furthermore, the first user cannot be confused with the second user, based at least on the different QR codes to be scanned by each user. Thus, the first user cannot be confused with the second user unless the first user reveals the first QR code to the second user. If the first user shares the QR code with the second user, then the event can be identified by the system, because the scanning device is subject to change, and the scan location is subject to change, and these changes are detectable by the system as described above. A variety of programs can be implemented to make use of such geo-temporal coordination computing features and may be distributed through the marketplace.

Likewise, programs can be implemented to facilitate the set-up and configuration procedures, and support teams may be available to guide stores through the implementation process. For instance, support may be provided on a per-store, per-system, per-QBar basis, among others. In one embodiment, each unique QBar may have a corresponding support team available to provide technical support for the specific QBar that is proving to be problematic in the owner's business. In the same or different embodiment, a database may be configured to keep a record of which support team is assigned to each specific QBar. In other configurations, a support team may be assigned as support for a specific business, to troubleshoot any problems encountered by the business through use of any of its QBars. In still further configurations, a support team may be assigned to monitor a system of QBars, or a subsystem of QBars, such as all employee facing QBars or all employee facing QBars within the kitchen environment of a restaurant. It will be appreciated that variations within support groupings are contemplated. For instance, in some embodiments, a generalized support team may be available to troubleshoot problems encountered by any business through use of any of the business's QBars, or systems of QBars. The support teams may be established before selling the QBar and assigned to a specific store when the QBar is sold. In the same or different embodiment, the vendor of the QBar system may have knowledge of local businesses and be able to provide advice on how to implement the QBar system within the business, including placement locations and program selections.

Other functionality may be provided for as well. For instance, in various configurations, the secure unique QR codes described herein can be used as a form of communication address. By way of example, the secure unique QR code can act as a link to a section of a database—once a user scans the code with a scanning device, an exchange of data can be facilitated between the scanning device (or another communicatively coupled device) and the linked database section. In this manner, the scanning user can communicate with the database. In turn, the database can be configured to promulgate updates to the data contained in the database to one or more devices connected to the database. In this manner, the secure unique QR code can act as a form of communication address. In various advantageous implementations, the secure unique QR code can be tied to a job or task, rather than an individual as would be customary with traditional systems.

Certain Methods of Detecting Forgeries

The secure, unique QR code carriers described herein enable additional features not found in the prior art. For example, in certain embodiments, the secure, unique QR code carrier can interface with a finite state machine configured to detect a risk of forgery when a test QR code carrier is scanned.

In various configurations, a risk of forgery is detected by analyzing scan parameters at a finite state machine to detect the probable presence of a duplicate QR code. For example, a finite state machine can be leveraged to determine whether a test QR code carrier is likely a duplicate of an authentic secure unique QR code carrier by analyzing parameters of the test QR code carrier scan. The parameters analyzed can include different aspects of the scan of the test QR code carrier, such as the current time of the test scan, the current location of the test scan, the ambient weather at the test scan, the time of the last scan of the secure unique QR code carrier, the location of the last scan of the secure unique QR code carrier, the ambient weather of the last scan of the secure unique QR code carrier, among others.

A forgery can be detected by taking a photograph of the test QR code carrier that was scanned. The photograph of the test QR code carrier can be compared to a stored image of the authentic secure unique QR code carrier to check for the presence of known unique machine errors. To facilitate detection of the unique machine errors, the photograph may be a high-resolution photograph. To facilitate the detection of unique machine errors, the photograph of the test QR code carrier may have a spatial resolution of at least 1 mm, such as 1 mm, 0.8 mm, 0.6 mm, 0.4 mm, 0.2 mm, 0.1 mm, 0.08 mm, 0.06 mm, 0.04 mm, 0.02 mm, 0.008 mm, 0.006 mm, 0.004 mm, 0.002 mm, or less. For instance, in some embodiments, the photograph may be a 12-megapixel photograph, a 24-megapixel photograph, a 50-megapixel photograph, a 100-megapixel photograph, a 150-megapixel photograph, a 200-megapixel photograph, 250-megapixel photograph, 300-megapixel photograph, 400-megapixel photograph, or higher. As used herein, spatial resolution refers to the size of inhomogeneities on the subject that can be detected in the photograph. Likewise, in various configurations the image of the secure unique QR code carrier may have a spatial resolution of at least 1 mm.

In various configurations, the resolution of the high-resolution photograph is dependent on one or more variables including: the size of the secure unique QR code carrier, the size of the engraved glyph, the features of the engraved glyph, and the precision of the machine used to engrave the glyph on the substrate. For instance, in one embodiment, a machine having a precision of about 0.1 mm may be used to inscribe a glyph on the surface of the substrate having a length in a first dimension of about 85.6 mm, and an aspect ratio of about 1.5. In this embodiment, each marking engraved on the substrate may be dislocated by about 0.1 mm due to the 0.1 mm precision of the machine. An image having a resolution of at least about 300 dots per inch (DPI) may be used to identify these dislocations. Specifically, a 300 DPI image includes 300 dots per inch, which corresponds to 0.085 mm per pixel. In one embodiment, the 300 DPI image depicts the secure unique QR code carrier at real world scale, where every pixel in the image corresponds to about 0.085 mm in the physical world. In this, and various other advantageous embodiments, the 300 DPI image may be used to identify the presence of expected pixel dislocations in the image. In a different embodiment, a machine with a precision of about 0.015 mm is used to engrave the glyph on a substrate. In this embodiment, a 24-megapixel photograph may be used to verify the presence of the unique machine errors. Specifically, a 24-megapixel photograph includes 24 million pixels. Distributed across an aspect ratio of 1.5, the photograph has a resolution of about 4,000×6,000 pixels. The 6,000 pixels distributed across the 85.6 mm length of the substrate yields about 0.014 mm per pixel, which is sufficient to verify the presence of pixel dislocations introduced by a machine having a precision of 0.015 mm. In a different embodiment, a machine having a precision of about 0.01 mm is used the engrave the glyph on the substrate having a length of about 85.6 mm and an aspect ratio of about 1.5. In this embodiment, a 50-megapixel image is used to verify the presence of known pixel dislocations. The 50-megapixel image has about 50,000,000 pixels distributed across an aspect ratio of about 1.5, yielding an image having a resolution of about 5773 pixels by about 8660 pixels. The 8660 pixels distributed across the substrate length of about 85.6 mm yields about 0.0098 mm per pixel, sufficient to identify the pixel dislocations produced by a machine having a precision of about 0.01 mm.

Figure 6:
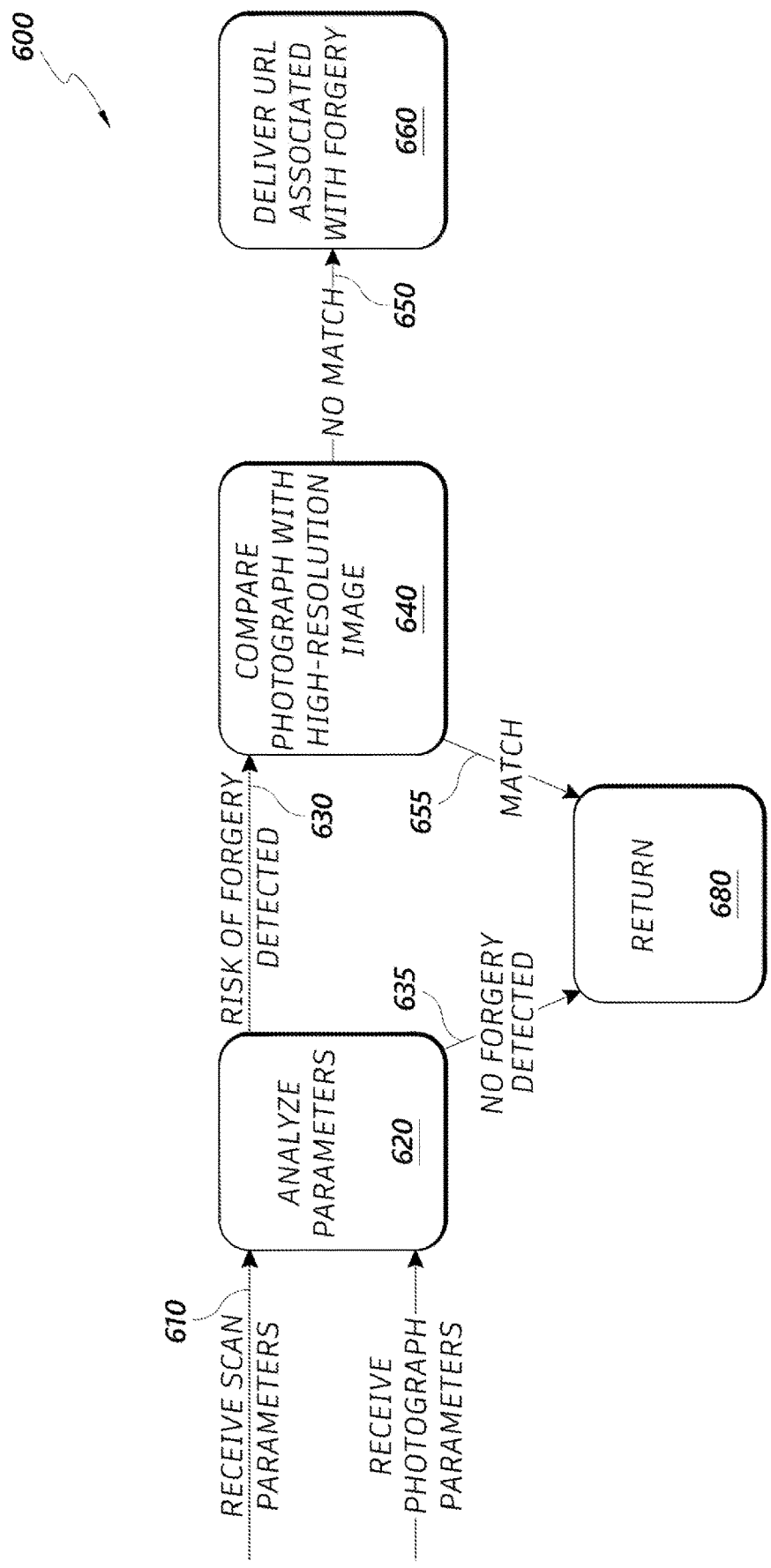
FIG. 6 is a state transition diagram that schematically illustrates a method for detecting a risk of forgery in accordance with certain embodiments of the present disclosure.

FIG. 6 schematically illustrates an embodiment of a state transition diagram of a finite state machine configured to detect a risk of forgery. As depicted in FIG. 6, the finite state machine system 600 comprises four states 620, 640, 660, and 680. Each of the four states 620, 640, 660, and 680 is associated with one or more actions and at least one input 610, 630, 635, 650, and 655. Each input points to the one or more states 620, 640, 660, and 680.

As depicted in FIG. 6, state 620 is associated with input 610. Input 610 includes receiving one or more of: parameters relating to the scan of a test QR code carrier and parameters relating to the photograph of the test QR code carrier. Upon receipt of input 610, the system 600 transitions to state 620. State 620 includes the action of analyzing the received parameters to detect a risk of forgery. Analyzing the received parameters to detect a risk of forgery may include receiving a time and location of the current scan, comparing the time and location to the most recently authenticated scan, and determining that the time and location of the most recent scan are not consistent with the existence of a single copy of the QR code carrier. For example, the location of the current scan may be geographically isolated from the location of the previously authenticated scan where a short duration of time has elapsed. In other embodiments, the location of the current scan may be from a geographic location that the user is not previously known to visit. Upon completion of the action, input 630 or input 635 is produced based on the determination. For instance, input 635 is produced where no risk of forgery is detected. Input 635 leads to state 680 where the method exits.

Where a risk of forgery is detected based on an analysis of the parameters, input 630 is produced. Input 630 leads to state 640. At state 640 parameters relating to a photograph of the test QR code carrier are compared with parameters relating to a high-resolution image of the secure unique QR code carrier. In other configurations, parameters relating to the photograph are received at state 640. In still further configurations, the parameters relating to the photograph are received at a prior state or input. As discussed above, due to the physical properties of the substrate, and the manner in which the glyph was engraved thereon, unique machine errors are present on the surface of the secure unique QR code carrier. Parameters relating to the photograph of the test QR code carrier can be analyzed to detect the presence of matching machine errors. Parameters relating to the photograph can include the photograph, digital derivatives of the photograph, meta-data associated with the photograph, and the like. For instance, in various configurations, the parameters of the photograph may include one or more of: the photograph, a digital copy of the photograph, a time the photograph was taken, a location where the photograph was taken, and the like.

Where matching machine errors are identified in state 640, input 655 is produced, and the system 600 transitions to state 680 where the method exits. Conversely, where matching machine errors are not identified, input 650 is produced and the system 600 transitions to state 660 where a URL associated with forgery detection is delivered. The URL may be delivered to the scanning device, to the owner of the secure unique QR code carrier, to an administrator of a system of secure unique QR code carriers, or elsewhere based on the particular implementation.

Programs can also be implemented to provide additional security upon scanning of the secure unique glyph. For instance, in some configurations a glyph can be configured to deliver a scanning device to a specified URL, or perform another function, only if the glyph is scanned a predefined number of times. If the glyph is scanned too few or too many times, the glyph can perform an alternate function, such as delivering a URL associated with fraud detection to the scanning device, or another device within the system. Advantageously, this configuration can provide additionally security, such as security from man-in-the-middle attacks, since potential interceptors of the glyph may not be aware of the number of scans required to reach the specified URL or effect another function.

Figure 7:
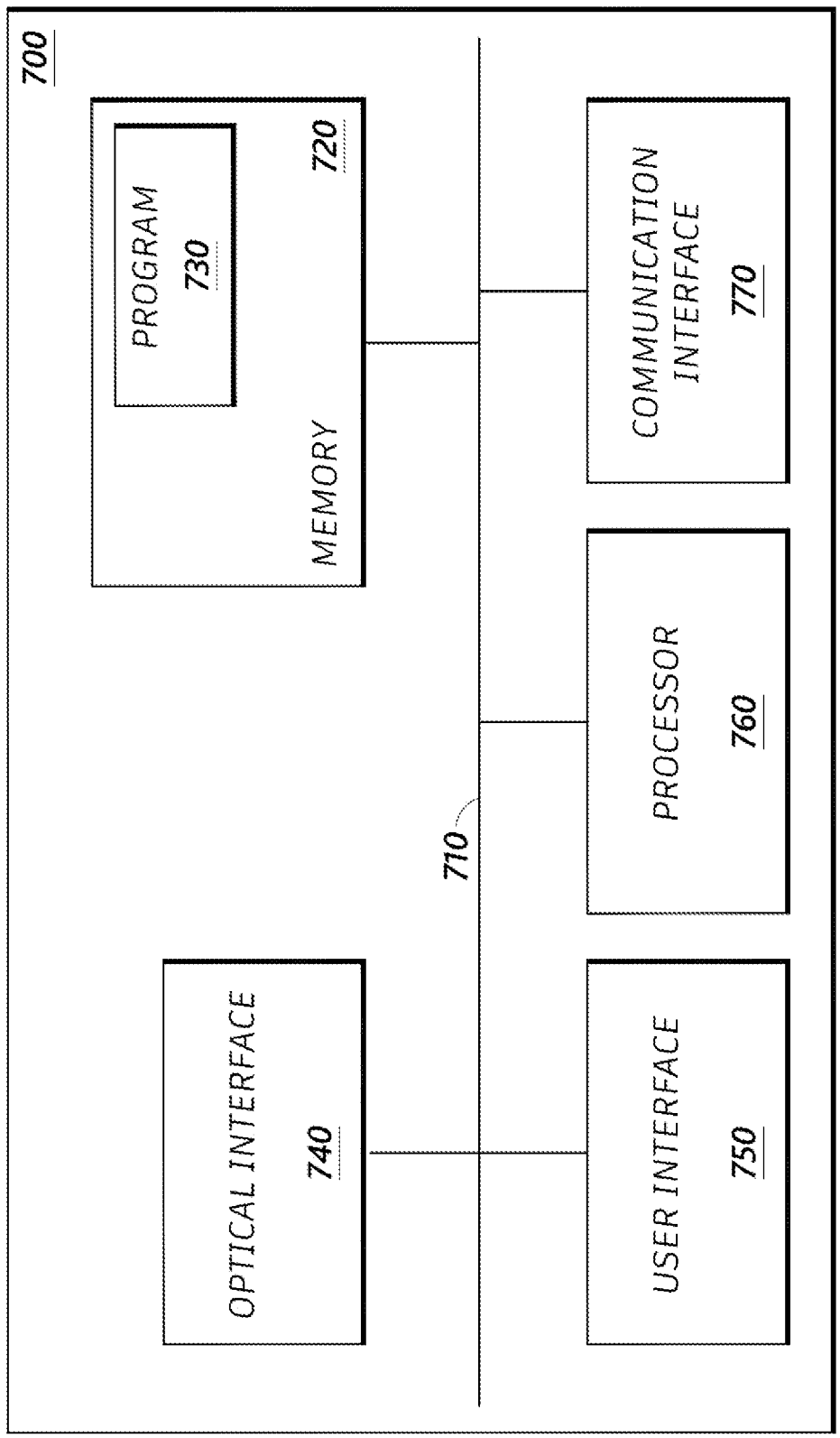
FIG. 7 is a block diagram depicting components of a computing apparatus or system in which various embodiments of the present disclosure may be implemented.

FIG. 7 generally illustrates various components of a computing system 700 that may be utilized to execute or that may embody components of certain embodiments disclosed herein, such as generating a series of connected glyphs or scanning a glyph. The components are understood to be in communication with one another through one or more interconnects or interfaces 710. For example, the computing device may include a memory 720, program instructions 730, optical interface 740, a processor or controller 760 to execute instructions 730, a network or communications interface 770, e.g., for communications with a network or other device. The memory 720 may be or include one or more of cache, RAM, ROM, SRAM, DRAM, RDRAM, EEPROM and other types of volatile or non-volatile memory capable of storing data. The optical interface 740 is configured to record or capture images and may be or include one or more of: a camera, a photodetector, point sensor, distributed sensor, beam sensor, photoresistor, photodiode, phototransistor, diode array, or the like. The user interface 750 is configured to provide operational data to a user and may include a screen, speaker, or microphone configured to provide and receive operational data to the user. In some configurations, the user interface 750 can be configured to receive data from a user, such as from voice input or through the input of text.

The processor unit 760 may be or include multiple processors, a single threaded processor, a multi-threaded processor, a multi-core processor, or other type of processor capable of processing data. Depending on the particular system component (e.g., whether the component is a computer or a mobile computing device such as a handheld mobile phone or computer), the interconnect 710 may include a system bus, LDT, PCI, ISA, or other types of buses, and the communications or network interface may, for example, be an Ethernet interface or other interface. The communications or network interface 770 may be configured to enable a system component to communicate with other system components such as across a network which may be a wireless network, wired network, mesh network, or various other networks. It should be noted that one or more components of computing system 700 may be located remotely and accessed via a network. Accordingly, the system configuration provided in FIG. 7 is provided to generally illustrate how embodiments may be configured and implemented.

EXAMPLES

Example 1

An algorithm for generating a QHex ID and QHex Salt may be implemented as follows
while True:

```
qhex_salt : str = "q" + "".join(random_str(QHEX_RAN-
DOM_STR_SIZE -1 ))
h = blake2b(
    digest_size=QHEX_DIGEST_SIZE,
    key=prev_qhex_id_b,
    person=QHEX_PERSON,
    salt=prev_qhex_salt_b,
)
h.update(qhex_salt.encode( ))
dk = h.digest( )
qhex_id = urlsafe_b64encode(dk[1 : (QHEX_DIGEST_SIZE -
1)]).decode( )
if (
      dk[0] == 0
      and dk[QHEX_DIGEST_SIZE] == 0
      and len(qhex_id) == QHEX_ID_LEN
      and qhex_id[QHEX_ID_LEN -1] != "="
):
    return qhex_id, qhex_salt
else:
    if time( ) - start_time > QHEX_MINE_MAX_TIME:
        return " ", " "
```

Example 2

A restaurant has deployed a series of action and interaction checkpoints throughout its premises in communication with a finite state machine which is in turn in communication with a database. Customer-facing action and interaction checkpoints include secure unique QR code carriers positioned outside the entrance of the restaurant, inside the lobby of the restaurant, and at each table. Employee facing action and interaction checkpoints include secure unique QR code carriers positioned in the kitchen, at the window where waiters retrieve prepared food from the kitchen, at an invoicing station, and at each table. Some action and/or interaction checkpoints can be both customer-facing and employee-facing, such as the secure unique QR code carriers positioned at each table.

In the present example, a customer may approach a restaurant and scan the secure unique QR code carrier outside the entrance of the restaurant. Based on the identity of the secure unique QR code carrier, the finite state machine can determine that the checkpoint outside the entrance of the restaurant has been activated. The finite state machine can further query the database to determine that the hardware ID used to scan the checkpoint has not been seen previously. Based on the foregoing determinations, the finite state machine may deliver a menu to the scanning device in conjunction with a new-visitor discount offer.

The customer may enter the restaurant and scan the secure unique QR code carrier in the lobby, thereby activating the checkpoint in the lobby. Based on the identity of the secure unique QR code carrier, and based on the hardware ID of the scanning device, the finite state machine can determine that the same customer has entered the restaurant and activated the checkpoint in the lobby by scanning the secure unique QR code carrier therein. In response, the finite state machine may deliver to the scanning device an interface through which the user may request to be seated and receive the new visitor discount. The visitor may further view a listing of tables and a time until the tables are available. The time until the tables are available may be provided based on workflow in the restaurant, which can be ascertained by analyzing past and current customer and employee experiences with action and interaction checkpoints located throughout the restaurant.

When the customers reservation time is reached, the customer may be seated. A waiter may scan a secure unique QR code carrier located at the table as the customer is seated to log the interaction, enabling the restaurant to determine the waiter for the interaction, and to estimate the time until the customer visit will conclude and the table will be free once again. The customer may place an order by scanning the secure unique QR code carrier located at the table, which can be configured to provide the customer with a menu that allows the customer to place an order.

Once the order is placed, the kitchen receives the order. A cook may scan a secure unique QR code carrier located in the kitchen to signal that preparation of the meal has begun. The customer may see the time that has elapsed since the cook began preparing the meal, and the estimated time until the meal will be served. When the meal has been prepared, the cook may scan another secure unique QR code carrier located at the kitchen window to signal that a waiter should collect and deliver the meal from the kitchen window.

After the meal is delivered, the waiter may scan the checkpoint at the table once more to signify that the meal has been delivered. Once the meal has been consumed, the customer may scan the secure unique QR code located at the table to receive and pay the invoice. If the customer is a returning customer, the customer may be presented with a survey. In other configurations, random customers may be selected to receive a survey.

The restaurant may use the data collected through the series of action and interaction checkpoints to analyze its practices and grow the business. For instance, the restaurant may mine the collected data to determine the number of customers that scan the checkpoint outside the restaurant in comparison to the number of customers that request seating from within the lobby. This data may be leveraged to estimate a conversion rate for customers passing by the restaurant. The restaurant may further analyze the collected data to determine the amount of time that typically elapses between a customer being seated, ordering, and having the food served. Furthermore, If the customer responds negatively to the survey, it is possible for the restaurant owner to review the transaction to determine which employees were involved in the interaction, as well as view details of the interaction such as how many times a waiter visited a table, the amount of time the customer spent in the restaurant, the amount of time until the customer received their food, and the like. The restaurant may use this data to determine how its processes can be improved.

Example 3

Systems utilizing secure unique QR code carriers can be used by a company to improve a user's experience with instructions by monitoring the user's progress and providing appropriate help. For example, a product may be sold with instructions for setting up the product. The instructions may include multiple steps. Each step can be associated with a secure unique QR code. The secure unique QR code can be scanned by the user to provide details concerning the specified step, such as providing the instruction or providing additional help or tips relating to the instruction. As each QR code is scanned, the secure unique QR code system can ascertain the time and location of each scan, along with the time elapsed since the previous scan. Since each QR code is unique, the data is also tied to each customer providing significantly enhanced data granularity as compared to traditional methods.

Example 4

Systems utilizing secure unique QR code carriers as described herein can facilitate various business use-cases. For example, a contractor business owner can advertise his business by placing an advertisement in the secure unique QR code carrier application ecosystem, where a potential customer may see the add and hire the contractor to build a fence. The contractor may visit the worksite to make measurements and to estimate the cost of the project. The contractor may leave a secure unique QR code carrier at the construction site. The customer may scan the QR code to accept the project. Upon scanning, the customer may be directed to a URL where the customer may input the customer's payment information to be held in the system until the work is complete. The contractor may then find one or more workers to complete the task. For instance, a first worker may be hired to dig holes for the fence posts. The first worker may arrive at the construction site, receive the work details by scanning the secure unique QR code carrier, and begin work. In some embodiments, privacy preserving authentication methods may be implemented to help preserve the privacy of the workers. For instance, the contractor may establish a pre-specified hand gesture to be shared with the contracted workers. In this manner, when the worker arrives to the job site, the worker can authenticate their presence without a strict requirement that their identity be disclosed. For example, the worker may authenticate their relationship to the contractor by performing the specified hand gesture, or by providing a pre-specified photograph to a scanning device or other computing system on the premises. Once the work is complete, the first worker can be prompted by the secure unique QR code carrier to take and upload photos of the completed work. The contractor may then be notified that the work is complete and review the photos and work. second worker can then be contacted the mount fence posts in the holes dug by the first worker, and the work may proceed as described. Once the work is complete, the workers can be paid from the payment information entered by the customer to initiate the project, allowing the system to facilitate escrow-like functions.

In this manner the secure unique QR code carriers facilitate the work being done. The secure unique QR code carriers record the time spent completing tasks, who completed the tasks, and allows for individual's performance to be tracked and rated. The system can also gather data concerning the interactions, including the total cost and time for the project to be completed. This data can then be mined to forecast likely costs and time to complete a task in a given region.

Example 5

In a similar manner, systems utilizing secure unique QR code carriers as described herein can facilitate cleaning services. A cleaning service owner may put an advertisement in the marketplace for secure unique QR code carrier finite state machines, programs, or program templates. A homeowner may view the ad and hire the cleaner. The ad may include instructions to photograph each room that needs cleaning and itemize what must be done, and the homeowner may leave a secure unique QR code carrier in the home to be scanned. A cleaner may also respond to the advertisement with an offer to complete the tasks. The cleaner then visits the home, scans the secure unique QR code, receives instructions for the rooms to be cleaned. The cleaner may complete the tasks and scan the secure unique QR code carrier and signify that the job has been completed. Geo-temporal restrictions can be implemented to ensure the cleaner is physically present at the expected location and at the expected time. The homeowner may then review the work performed and scan the secure unique QR code carrier to acknowledge that the tasks are complete and issue payment and provide an opportunity to rate the work performed. To protect the privacy of workers within the system, certain privacy preserving verification methods may be implemented. For instance, the cleaners may use pre-specified hand gestures to authenticate their presence.

Example 6

Systems utilizing secure unique QR code carriers as described herein can enable anonymized document storage. A user may obtain a secure unique QR code carrier. The user may configure the secure unique QR code carrier to point to a 30-byte URL providing access to a document repository. Since the URL is 30 bytes long, there are $30^{256}$ possible combinations, making it infeasible to guess the URL and obtain access to the document repository, providing a level of security that does not require authentication. In this fashion, a user may provide relatively secure access to certain documents without requiring a username or password when the secure unique QR code carrier is scanned. For instance, a patient may upload documents relating to the treatment of certain rare disorders. If taken to a hospital, the secure unique QR code carrier may be scanned by the treating physician to reveal the documents relating to the patient it was found upon without a need for authentication. However, if the secure unique QR code carrier were lost and found on the street, the individual's privacy may be preserved since it would not be feasible to tie the secure unique QR code carrier, or documents stored in the repository to the individual without further information.

Certain Terminology

As used herein, the term "secure unique QR code carrier" has its ordinary and customary meaning, and includes, among other things, any substrate having engraved or printed thereon a QR code, or other glyph configured to encode data, wherein one or more of the substrate or glyph exhibit abnormalities which can be used to distinguish two carriers purportedly marked with the same glyph. The term "QBar," as used herein, is understood to refer to any secure unique QR code carrier.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

The terms "comprising," "including," "having," and the like are synonymous and are used inclusively, in an open-ended fashion, and do not exclude additional elements, features, acts, operations, and so forth. Likewise, the terms "some," "certain," and the like are synonymous and are used in an open-ended fashion. Also, the term "or" is used in its inclusive sense (and not in its exclusive sense) so that when used, for example, to connect a list of elements, the term "or" means one, some, or all of the elements in the list.

The terms "approximately," "about," and "substantially" as used herein represent an amount close to the stated amount that still performs a desired function or achieves a desired result. For example, in some embodiments, as the context may dictate, the terms "approximately", "about", and "substantially" may refer to an amount that is within less than or equal to 10% of the stated amount. The term "generally" as used herein represents a value, amount, or characteristic that predominantly includes, or tends toward, a particular value, amount, or characteristic. As an example, in certain embodiments, as the context may dictate, the term "generally parallel" can refer to something that departs from exactly parallel by less than or equal to 20 degrees and/or the term "generally perpendicular" can refer to something that departs from exactly perpendicular by less than or equal to 20 degrees.

Overall, the language of the claims is to be interpreted broadly based on the language employed in the claims. The claims are not to be limited to the non-exclusive embodiments and examples that are illustrated and described in this disclosure, or that are discussed during the prosecution of the application.

The following is claimed:

1. A system including a processor and memory, the memory containing instructions that when executed by the processor cause the processor to:
   generate a first glyph from a first identification string, wherein the first identification string is a cryptographic digest resulting from hashing a first salt and an initial identification string;
   generate a second identification string by:
      hashing a second salt with the first identification string to obtain a second identification string; and
   use the second identification string as a seed to generate a second glyph.

2. A method for generating a series of connected glyphs, wherein each glyph is based on the previously generated glyph, the method comprising:
   generating a first glyph from a first identification string, wherein the first identification string is a digest containing at least one predetermined byte, the digest resulting from hashing a first salt and an initial identification string;
   generating a second identification string by:
      hashing a second salt with the first identification string to obtain a second identification string containing a predetermined byte;
   using the second identification string to generate a second glyph that is based on the first glyph.

3. The method of claim 2, wherein the first identification string is a URL-safe digest having a predetermined length resulting from hashing a first salt and an initial identification string;
   wherein the first and second salts begin with a predetermined character and have a predetermined length; and
   wherein the first glyph is a pixel matrix readable as a 2-dimensional barcode.

4. The method of claim 3, further comprising generating a first security string based on the identity of the first salt.

5. The method of claim 4, further comprising modifying the first pixel matrix readable as a 2-dimensional barcode based on the identity of the first security string;
   wherein the 2-dimensional barcode comprises columns and rows of pixels;
   wherein modifying the 2-dimensional barcode based on the identity of the first salt comprises:
      obtaining the alphabet index of first four characters of the first salt to yield a first security string consisting of four numbers;
      reversing a first pixel in the corresponding row of the first column based on the first character of the security string;
      reversing a second pixel in the corresponding row of the second column based on the second character of the security string;
      reversing a third pixel in the corresponding row of the third column based on the third character of the security string; and
      reversing a fourth pixel in the corresponding row of the fourth column based on the fourth character of the security string.

6. The method of claim 2, wherein the initial identification string was previously used to generate a glyph.

7. The method of claim 2, wherein the at least one predetermined byte includes at least one of starting with "00" and ending with "00".

8. The method of claim 2, wherein the salt is a randomly selected string beginning with a predefined character.

9. The method of claim 2, wherein modifying the glyph based on the security string includes generating a security code based on the security string and modifying the glyph based on the security code.

10. The method of claim 9, wherein modifying the glyph based on the security code includes preparing instructions to reverse pixels of the glyph based on the identity of the security code.

11. The method of claim 2, wherein the digest is limited to 32 URL-safe characters.

12. The method of claim 11, wherein generating a glyph based on the digest includes converting the digest into base64 and appending the result to a subdomain to yield a URL.

13. The method of claim 12, wherein the glyph is a QR code that when scanned causes a device to navigate to the URL.

14. The method of claim 13, wherein the device is only caused to navigate to the URL when the glyph is scanned a predetermined number of times.

15. The method of claim 2, wherein generating a glyph includes generating a QR matrix.

16. The method of claim 2, wherein generating a glyph includes inscribing a glyph on a substrate and storing a photograph of the inscription on the substrate.

17. The method of claim 16, wherein the photograph has a spatial resolution of at least 1 mm.

18. The method of claim 16, further comprising: receiving a scanning photograph of an inscription on a substrate from a scanning device.

19. The method of claim 18, wherein the glyph encodes a URL pointing to a first resource, the resource configured to redirect to a second resource if the scanning photograph matches the stored photograph of the inscription on the substrate.

\* \* \* \* \*